(12) United States Patent
Miller et al.

(10) Patent No.: US 11,569,669 B2
(45) Date of Patent: Jan. 31, 2023

(54) PRE-CHARGING USING CENTER POINT NODE

(71) Applicant: Infineon Technologies AG, Neubiberg (DE)

(72) Inventors: Andreas Miller, Taufkirchen (DE); Radovan Vuletic, Munich (DE)

(73) Assignee: Infineon Technologies AG, Neubiberg (DE)

( * ) Notice: Subject to any disclaimer, the term of this patent is extended or adjusted under 35 U.S.C. 154(b) by 172 days.

(21) Appl. No.: 17/183,833

(22) Filed: Feb. 24, 2021

(65) Prior Publication Data

US 2022/0271541 A1 Aug. 25, 2022

(51) Int. Cl.
*H02J 7/00* (2006.01)

(52) U.S. Cl.
CPC .......... *H02J 7/0024* (2013.01); *H02J 7/0019* (2013.01); *H02J 2207/20* (2020.01)

(58) Field of Classification Search
CPC .................................................... H02J 7/0024
USPC ......................................................... 320/117
See application file for complete search history.

(56) References Cited

U.S. PATENT DOCUMENTS

| 8,466,657 B2* | 6/2013 | Buono | H02J 7/0019 320/120 |
|---|---|---|---|
| 10,106,038 B2* | 10/2018 | Jiang | H01M 10/425 |
| 2017/0170725 A1* | 6/2017 | Giuliano | H02M 3/07 |
| 2017/0256939 A1* | 9/2017 | Logiudice | H02H 9/046 |

* cited by examiner

*Primary Examiner* — Yalkew Fantu
(74) *Attorney, Agent, or Firm* — Shumaker & Sieffert, P.A.

(57) ABSTRACT

A device for connecting a first network comprising a first energy storage element and a second network comprising a second energy storage element includes switching circuitry and pre-charging circuitry. The switching circuitry is configured to electrically couple the first network and the second network. The switching circuitry comprises a first switching element configured to bi-directionally allow current between the first network and a center point node when operating in a closed state. The switching circuitry further comprises a second switching element configured to bi-directionally allow current between the second network and the center point node when operating in a closed state. The pre-charging circuitry is configured to limit current to the center point node when a first voltage at the first energy storage element equalizes with a second voltage at the second energy storage element.

20 Claims, 14 Drawing Sheets

PRE-CHARGING USING CENTER POINT NODE

TECHNICAL FIELD

This disclosure relates a systems with multiple power networks.

BACKGROUND

A first power network may include a first battery and a second power network may include a second battery. One or more switches may be configured to provide a connect function to enable bi-directional current flow between the first power network and the second power network and a disconnect function to prevent current flow between the first power network and the second power network.

SUMMARY

In general, this disclosure is directed to techniques for pre-charging a power network prior to connecting the power networks (also referred to herein as simply "networks"). Pre-charging a network may help to limit inrush currents when connecting the network to another network. For example, pre-charging circuitry may connect a first network comprising a first battery to a second network comprising a second battery. The pre-charging circuitry may limit the current flowing between the first battery and the second battery until voltage is equalized, which may help to prevent damage to the first and second batteries. While this example uses a battery as an energy storage unit, examples may include other energy storage units.

For example, a first network may include a first energy storage element and a second network may include a second energy storage element. A first switching element may be configured to bi-directionally allow current between the first network and a center point node when operating in a closed state. Similarly, a second switching element may be configured to bi-directionally allow current between the second network and the center point node when operating in a closed state. In this example, pre-charging circuitry may be configured to limit current to the center point node when a first voltage at the first energy storage element equalizes with a second voltage at the second energy storage element. In this way, the pre-charging circuitry may limit a current flow between the first network and the second network, which may limit a current flow between the first energy storage element and the second energy storage element. For instance, the pre-charging circuitry may limit current between batteries of the first and second networks. Limiting current between the first energy storage element and the second energy storage element may help to prevent damage to the system and may help to improve a safety of the system.

In one example, a device for connecting a first network comprising a first energy storage element and a second network comprising a second energy storage element includes switching circuitry and pre-charging circuitry. The switching circuitry is configured to electrically couple the first network and the second network. The switching circuitry comprises a first switching element configured to bi-directionally allow current between the first network and a center point node when operating in a closed state and to block current in one direction between the first network and the center point node when operating in an open state. The switching circuitry further comprises a second switching element configured to bi-directionally allow current between the second network and the center point node when operating in a closed state and to block current in one direction between the second network and the center point node when operating in an open state. The pre-charging circuitry is configured to limit current to the center point node when a first voltage at the first energy storage element equalizes with a second voltage at the second energy storage element.

In another example, this disclosure describes a method for connecting a first network comprising a first energy storage element and a second network comprising a second energy storage element includes controlling, by processing circuitry, pre-charging circuitry to equalize a first voltage at the first energy storage element with a second voltage at the second energy storage element. The pre-charging circuitry is configured to, when controlling the pre-charging circuitry to equalize the first voltage and the second voltage, limit current to a center point node. A first switching element is configured to bi-directionally allow current between the first network and the center point node when operating in a closed state and to block current in one direction between the first network and the center point node when operating in an open state. A second switching element is configured to bi-directionally allow current between the second network and the center point node when operating in a closed state and to block current in one direction between the second network and the center point node when operating in an open state. The method further comprises controlling, by the processing circuitry, the first switching element to operate in the closed state to electrically couple the center point node to the first network after controlling the pre-charging circuitry to equalize the first voltage and the second voltage. The method further comprises controlling, by the processing circuitry, the second element to operate in the closed state to electrically couple the center point node to the second network after controlling the pre-charging circuitry to equalize the first voltage and the second voltage.

In another example, this disclosure describes a system that includes a first network comprising a first energy storage element, a second network comprising a second energy storage element, switching circuitry, and pre-charging circuitry. The first switching element is configured to bi-directionally allow current between the first network and a center point node when operating in a closed state and to block current in one direction between the first network and the center point node when operating in an open state. The second switching element is configured to bi-directionally allow current between the second network and the center point node when operating in a closed state and to block current in one direction between the second network and the center point node when operating in an open state. The pre-charging circuitry is configured to limit current to the center point node when a first voltage at the first energy storage element equalizes with a second voltage at the second energy storage element.

Details of these and other examples are set forth in the accompanying drawings and the description below. Other features, objects, and advantages will be apparent from the description and drawings, and from the claims.

DETAILED DESCRIPTION

Figure 1:
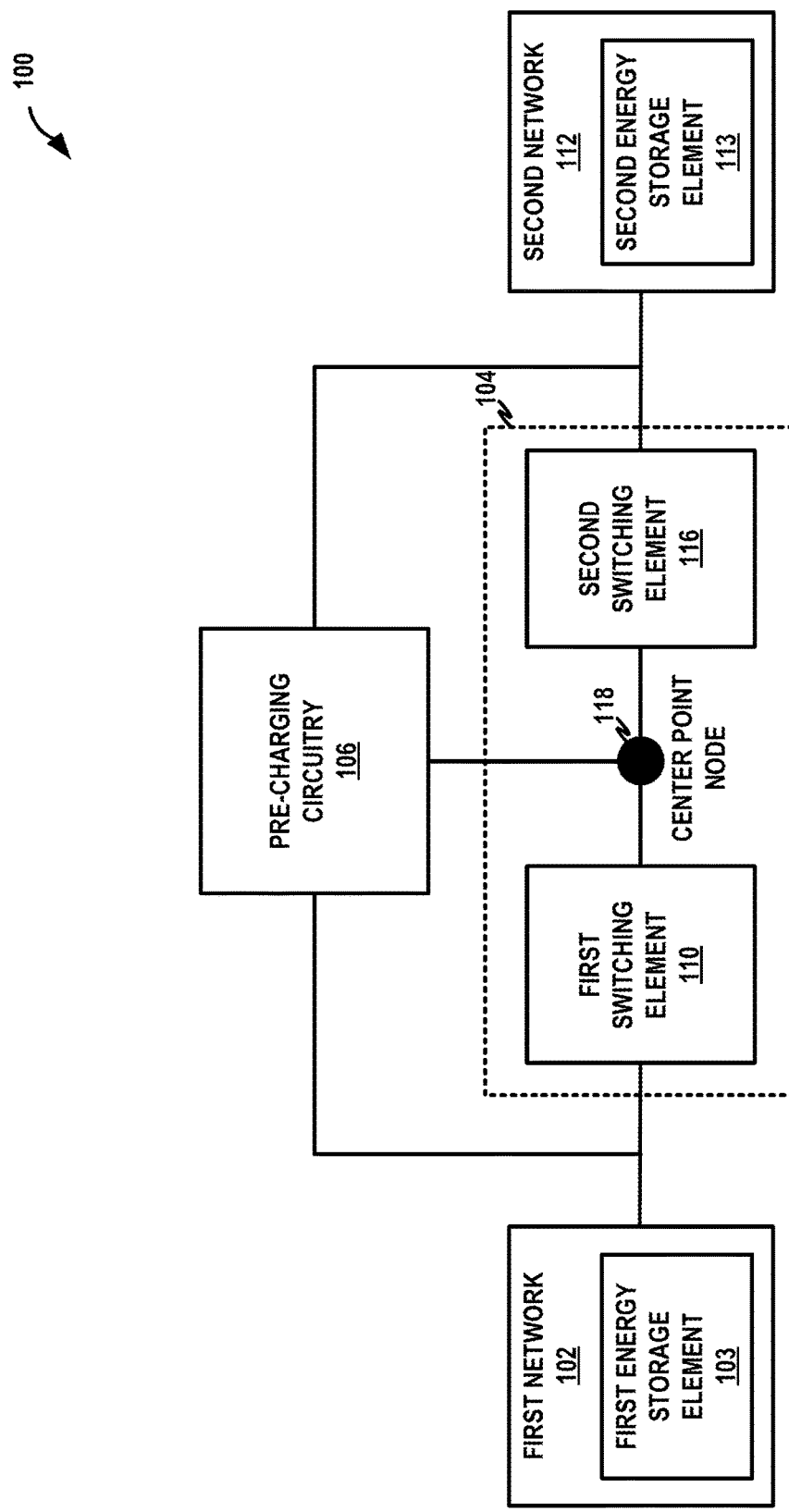
FIG. 1 is a block diagram illustrating an example system configured for connecting a first network and a second network, in accordance with one or more techniques of this disclosure.

Techniques described herein may be applied to systems comprising a first power network, which is also referred to herein as simply a "first network," and a second power network, which is also referred to herein as simply a "second network." While examples described herein refer to networks that comprise a battery as an energy storage unit, some examples may additionally or alternatively use other energy storage units, such as, for example, one or more capacitors, flywheels, fuel cells, power generators, power converters, or other energy storage devices or units.

A wide variety of different systems may use multiple networks that may be connected or disconnected by switching circuitry. For example, one or more switches may be configured to provide a connect function to enable bi-directional current flow between the first network and the second network and a disconnect function to prevent current flow between the first network and the second network. The system may use pre-charging circuitry that may help to limit inrush currents when connecting the first network and the second network. For example, the pre-charging circuitry may connect a first battery of the first network to a second battery of the second network. The pre-charging circuitry may limit the current flowing between the first battery and the second battery, which may help to prevent damage to the first and second batteries. While this example uses a battery as an energy storage unit, examples may include other energy storage units.

Some systems may use pre-charging circuitry that includes a pre-charging resistor configured with a relatively large resistance to limit the current between the first network and the second network. For example, in response to an indication that the state of the switching circuitry is to change from disconnected to connected, the switching circuitry may remain disconnected and the pre-charging circuitry may connect the first network and the second network via the pre-charging resistor. When a difference in voltage between the first network and the second network is less than a threshold, the pre-charging circuitry may prevent the current flow from the first network and the second network via the pre-charging resistor and the switching circuitry may connect the first network and the second network to provide connection functionality. For instance, the switching circuitry may close a switching element (e.g., a semiconductor device) to directly connect the first network and the second network. In this way, the system may help to enable current flow in both directions with relatively low resistive losses when operating in the connected state, may ensure disconnection of the first network and the second network when operating in the disconnected state, and may limit inrush currents when pre-charging.

However, systems using a pre-charging resistor may comprise rating limitations to limit the inrush currents. For example, the resistance value of the pre-charging resistor may be 1.3 ohms for a 12 V vehicle application with a pre-charging time of 200 ms @ 30 mF and with no resistive load during pre-charging. In this example, the power rating of the pre-charging resistor may be 197 W @ 16 V or 997 W @ 36 V. The resistive pre-charging may be relatively inefficient because the pre-charging resistor may generate a significant amount of heat. Moreover, the pre-charging resistor may rely on temperature protection to dissipate the heat generated during pre-charging to help to prevent damage to the pre-charging resistor, which may increase a cost and/or complexity of the system. The pre-charging current may not be effectively controlled because the pre-charging current may be determined by exponential function. Further, a maximum pre-charging current is dependent on a voltage level (e.g. 12 V vs. 24 V). As such, systems relying on a pre-charging resistor may be limited to a voltage level and/or may allow a significant variation in a maximum pre-charging current.

In accordance with the techniques of the disclosure, a system may be configured to use a common point pre-charging topology with passive or active pre-charging direction control. As described further below, the pre-charging circuitry may be configured to limit current using, for example, a switched-mode power supply (SMPS) or a linear current source, which may limit current with less heat compared to a pre-charging resistor. Examples of a switched-mode power supply may include a buck converter. Pre-charging direction control may refer to control between a first current flow from the first network to the second network and a second current flow from the second network to the first network.

In some examples, the common point pre-charging topology may include pre-charging circuitry configured to limit current to a center point node of switching circuitry. For example, switching circuitry may include switching elements that allow or block current in one direction based on a state of the switching element and always allows current in the other direction. For instance, a switching element may comprise a metal-oxide-semiconductor field-effect transistor (MOSFET) that generates a channel based on a state of the MOSFET that allows current to flow in a positive direction (e.g., from a drain to source) and includes an intrinsic diode that always allows current to flow in negative direction (e.g., from a source to drain).

In a first example, a first switching element may always allow current to flow from the center point node to the first network and a second switching element may always allow current to flow from the center point node to the second network. In this example, the pre-charging circuitry may rely on the first and second switching elements to allow current to flow from the center point node to the first and second networks. For instance, the pre-charging circuitry may rely on the intrinsic diodes of the MOSFETs to allow current to flow from the center point node to the first and second networks.

In a second example, a first switching element may always allow current to flow from the first network to the center point node and a second switching element may always allow current to flow from the second network to the center point node. In this example, the pre-charging circuitry may rely on the first and second switching elements to allow current to flow from the first and second networks to the center point node. For instance, the pre-charging circuitry may rely on the intrinsic diodes of the MOSFETs to allow current to flow from the first and second networks to the center point node.

Using the center point node of the switching circuitry may allow the pre-charging circuitry to benefit from the current blocking characteristics of the switching circuitry to reduce a number of components used for the pre-charging circuitry. For example, rather than relying on additional switching elements to connect a terminal of the pre-charging circuitry to the network with a lowest voltage, the pre-charging circuitry may rely on the switching elements (e.g., intrinsic diodes of MOSFETs) to allow the current to flow to the network with the lower voltage. Similarly, rather than relying on additional switching elements to connect a terminal of the pre-charging circuitry to the network with a highest voltage, the pre-charging circuitry may rely on switching elements (e.g., intrinsic diodes of MOSFETs) to allow the current to flow to the network with the highest voltage. In this way, a number of components may be reduced compared to systems that do not use a center point node to pre-charge.

For example, a first network may include a first energy storage element and a second network may include a second energy storage element. A first switching element of the switching circuitry may be configured to bi-directionally allow current between the first network and the center point node when operating in a closed state and to block current in one direction between the first network and the center point node when operating in an open state. Similarly, a second switching element of the switching circuitry may be configured to bi-directionally allow current between the second network and the center point node when operating in a closed state and to block current in one direction between the second network and the center point node when operating in an open state.

In this example, the pre-charging circuitry may be configured to limit current to the center point node (e.g., using a current source or a switched-mode power supply) when a first voltage at the first energy storage element equalizes with a second voltage at the second energy storage element. In this way, the pre-charging circuitry may limit a current flow between the first network and the second network, which may limit a current flow between the first energy storage element and the second energy storage element. For instance, the pre-charging circuitry may limit current between batteries of the first and second networks. Limiting current between the first energy storage element and the second energy storage element may help to prevent damage to the system and may help to improve a safety of the system.

FIG. 1 is a block diagram illustrating an example system configured for connecting a first network 102 and a second network 112, in accordance with one or more techniques of this disclosure. As illustrated in this example of FIG. 1, system 100 may include first network 102, switching circuitry 104, pre-charging circuitry 106, and second network 112.

First network 102 may represent a bus for a first energy storage element 103. First energy storage element 103 may comprise one or more batteries or capacitors. First network 102 may include one or more energy generation units configured to charge first energy storage element 103. Similarly, second network 112 may represent a bus for a second energy storage element 113. Second energy storage element 113 may also comprise one or more batteries or capacitors. Second network 112 may include one or more energy generation units configured to charge second energy storage element 113.

Switching circuitry 104 may be configured to electrically couple first network 102 and second network 112. As shown, switching circuitry 104 may include a first switching element 110 and a second switching element 108 that are both electrically coupled to center point node 118. First switching element 110 may be configured to bi-directionally allow current between first network 102 and center point node 118 when operating in a closed state and to block current in one direction between first network 102 and center point node 108 when operating in an open state. Second switching element 116 may be configured to bi-directionally allow current between second network 112 and center point node 118 when operating in a closed state and to block current in one direction between second network 112 and center point node 118 when operating in an open state.

Examples of switching elements may include, but are not limited to, a silicon-controlled rectifier (SCR), a Field Effect Transistor (FET), and a bipolar junction transistor (BJT). Examples of FETs may include, but are not limited to, a junction field-effect transistor (JFET), a metal-oxide-semiconductor FET (MOSFET), a dual-gate MOSFET, an insulated-gate bipolar transistor (IGBT), any other type of FET, or any combination of the same. Examples of MOSFETS may include, but are not limited to, a depletion mode p-channel MOSFET (PMOS), an enhancement mode PMOS, depletion mode n-channel MOSFET (NMOS), an enhancement mode NMOS, a double-diffused MOSFET (DMOS), any other type of MOSFET, or any combination of the same. MOSFETS may be formed in silicon, gallium nitride (GaN), silicon carbide (SiC) or other semiconductor materials. Examples of BJTs may include, but are not limited to, PNP, NPN, heterojunction, or any other type of BJT, or any combination of the same. It should be understood that switching elements may be high-side or low-side switching elements. Additionally, switching elements may be voltage-controlled and/or current-controlled. Examples of current-controlled switching elements may include, but are not limited to, GaN MOSFETs, BJTs, or other current-controlled elements. In some examples, a switching element may comprise a bi-directionally blocking device with a diode. For example, a switching element may include an IGBT with a diode in anti-parallel with the IGBT.

Pre-charging circuitry 106 may be configured to limit current to center point node 118 when a first voltage at first energy storage element 103 equalizes with a second voltage at second energy storage element 113. For example, pre-charging circuitry 106 may include a switched-mode power supply or a linear current source.

A controller may be configured to control one or more of switching circuitry 104 and pre-charging circuitry 106. For example, the controller may control pre-charging circuitry 106 to perform a pre-charging function before controlling switching circuitry 104 to connect first network 102 and second network 112. The controller may include an analog circuit and/or a digital circuit. In some examples, the controller may be a microcontroller on a single integrated circuit containing a processor core, memory, inputs, and outputs. For example, the controller may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

In accordance with one or more techniques described herein, pre-charging circuitry 106 may equalize a first voltage at first energy storage element 103 with a second voltage at second energy storage element 113. For example, processing circuitry (e.g., a controller) may control pre-charging circuitry 106 to equalize the first voltage at first energy storage element 103 with the second voltage at second energy storage element 113 until a voltage difference between the first voltage and the second voltage is less than a threshold.

First switching element 110 may operate in the closed state to electrically couple center point node 118 to first network 102 after pre-charging circuitry 106 equalizes the first voltage and the second voltage. For example, processing circuitry (e.g., a controller) may control first switching element 110 to switch from operating in an open state to a closed state to electrically couple center point node 118 to first network 102 after controlling pre-charging circuitry 106 to equalize the first voltage and the second voltage.

Second switching element 116 may operate in the closed state to electrically couple center point node 118 to second network 112 after pre-charging circuitry 106 equalizes the first voltage and the second voltage. For example, processing circuitry (e.g., a controller) may control second switching element 116 to switch from operating in an open state to a closed state to electrically couple center point node 118 to second network 112 after controlling pre-charging circuitry 106 to equalize the first voltage and the second voltage. First switching element 110 and second switching element 116 may close simultaneously, sequentially, or with using a delay (e.g., a pre-configured delay or a determined delay).

In this way, pre-charging circuitry 106 may be configured to limit current using, for example, a switched-mode power supply or a linear current source, which may limit current with less heat compared to a pre-charging resistor. Moreover, using center point node 118 may allow pre-charging circuitry 106 to benefit from the current blocking characteristics of switching circuitry 104 to reduce a number of components used for pre-charging circuitry 106. For example, rather than relying on additional switching elements to connect a terminal of pre-charging circuitry 106 to the network with a lowest voltage (e.g., first network 102 or second network 112), pre-charging circuitry 106 may use switching elements 110, 116 (e.g., intrinsic diodes of MOSFETs) to allow the current to flow to the network with the lower voltage. Similarly, rather than relying additional switching elements to connect a terminal of pre-charging circuitry 106 to the network with a highest voltage (e.g., first network 102 or second network 112), pre-charging circuitry 106 may use on switching elements 110, 116 (e.g., intrinsic diodes of MOSFETs) to allow the current to flow to the network with the highest voltage. In this way, a number of components may be reduced compared to systems that do not use center point node 118 to pre-charge.

Figure 2:
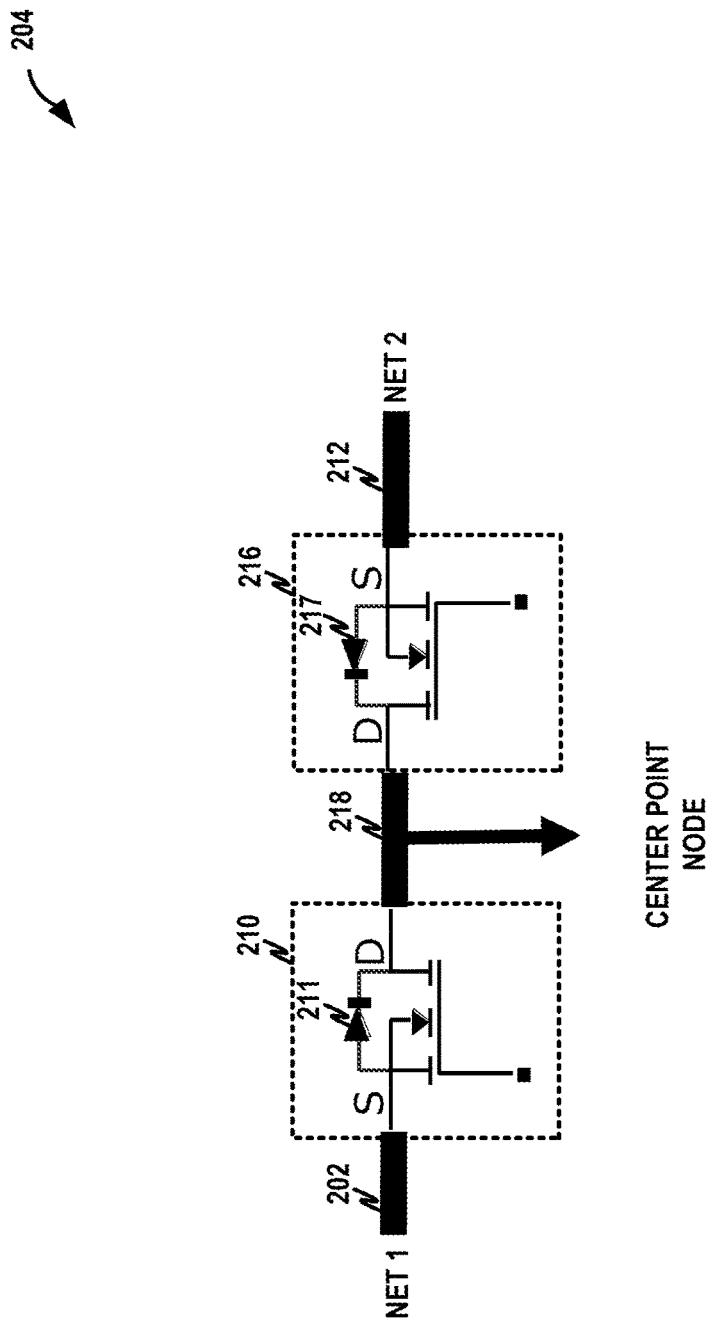
FIG. 2 is a conceptual diagram illustrating a first example of switching circuitry, in accordance with one or more techniques of this disclosure.

FIG. 2 is a conceptual diagram illustrating a first example of switching circuitry 204, in accordance with one or more techniques of this disclosure. First network 202, switching circuitry 204, and second network 212 may be examples of first network 102, switching circuitry 104, and second network 112 of FIG. 1, respectively. As shown, switching circuitry 204 may include a first n-channel metal-oxide-semiconductor field-effect transistor (n-channel MOSFET) 210 and a second n-channel MOSFET 216, which may be examples of switching element 110 and switching element 116 of FIG. 1, respectively.

First n-channel MOSFET 210 may comprise a source coupled to first network 210 and a drain coupled to center point node 218. As shown, first n-channel MOSFET 210 may include a first intrinsic diode 211 comprising an anode coupled to first network 202 and a cathode coupled to center point node 218. Similarly, second n-channel MOSFET 216 may comprise a drain coupled to center point node 218 and a source coupled to second network 212. Second n-channel MOSFET 216 may include a second intrinsic diode 217 comprising an anode coupled to second network 212 and a cathode coupled to center point node 218. As such, switching circuitry 204 may represent a common drain and a drain-source-source-drain (DSSD) topology, where two gate drivers are used and no function test (e.g., switch-off) is available.

Figure 3:
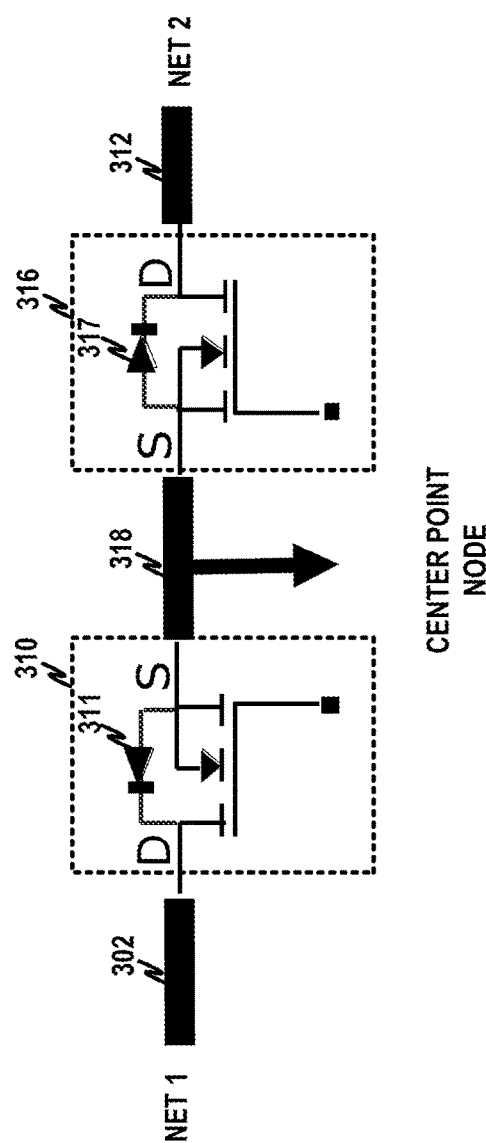
FIG. 3 is a conceptual diagram illustrating a second example of switching circuitry, in accordance with one or more techniques of this disclosure.

FIG. 3 is a conceptual diagram illustrating a second example of switching circuitry 304, in accordance with one or more techniques of this disclosure. First network 302, switching circuitry 304, and second network 312 may be examples of first network 102, switching circuitry 104, and second network 112 of FIG. 1, respectively. As shown, switching circuitry 304 may include a first n-channel metal-oxide-semiconductor field-effect transistor (n-channel MOSFET) 310 and a second n-channel MOSFET 316, which may be examples of switching element 110 and switching element 116 of FIG. 1, respectively.

First n-channel MOSFET 310 may comprise a drain coupled to first network 310 and a source coupled to center point node 318. As shown in FIG. 3, first n-channel MOSFET 310 may include a first intrinsic diode 311 comprising an anode coupled to center point node 318 and a cathode coupled to first network 302. Similarly, second n-channel MOSFET 316 may comprise a source coupled to center point node 318 and a drain coupled to second network 312. Second n-channel MOSFET 316 may include a second intrinsic diode 317 comprising an anode coupled to center point node 318 and a cathode coupled to second network 312. As such, switching circuitry 304 may represent a common source and a source-drain-drain-source (SDDS) topology that is suitable for control with a single gate drivers and where a function test (e.g., switch-off) is available (two gate drivers may be used for independent testing). In some examples, additional diodes needed for a gate driver supply compared to switching circuitry 204 of FIG. 2.

Figure 4:
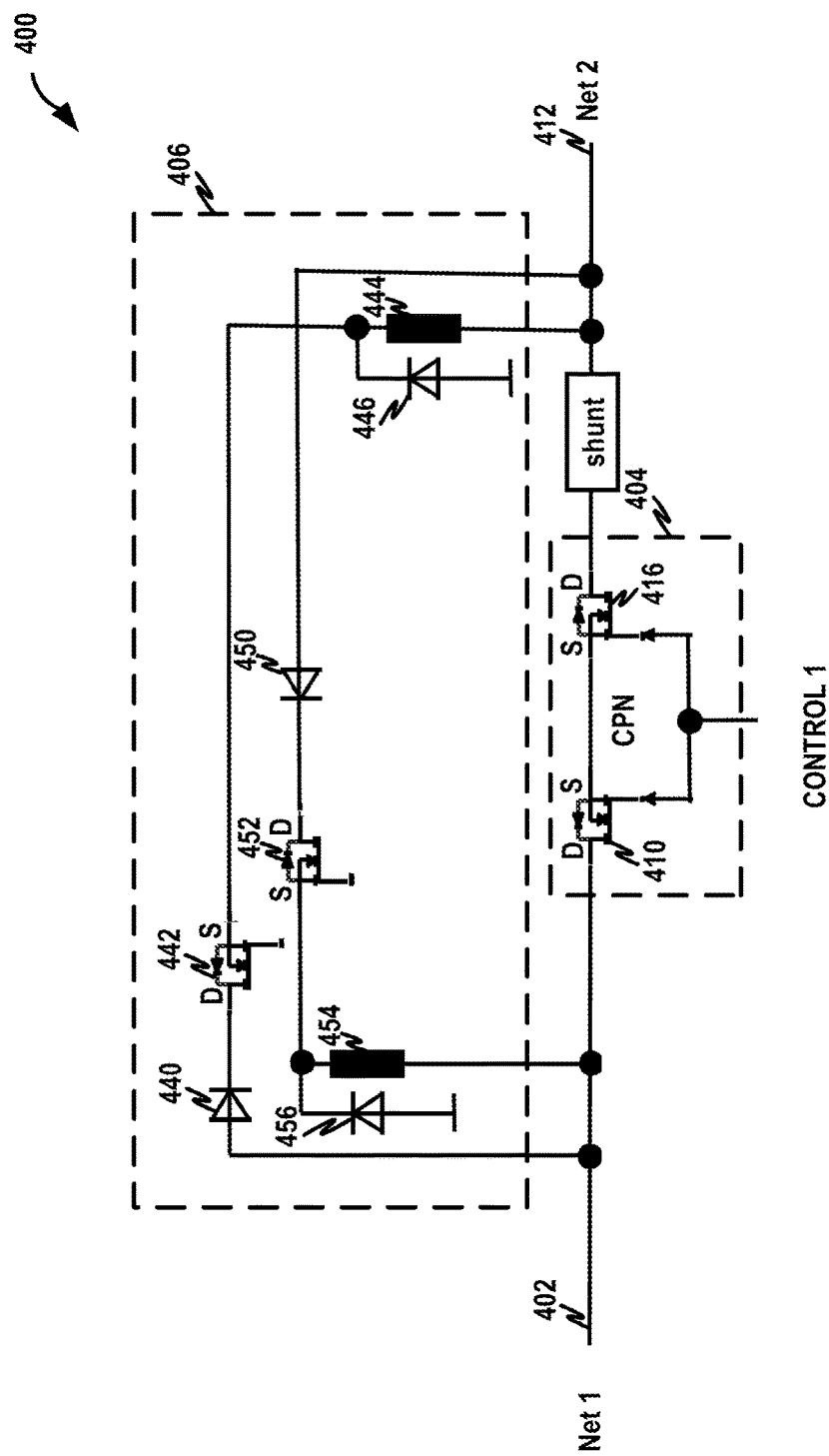
FIG. 4 is a conceptual diagram illustrating an example system configured for connecting a first network and a second network using a step-down converter for each network, in accordance with one or more techniques of this disclosure.

FIG. 4 is a conceptual diagram illustrating an example system 400 configured for connecting a first network 402 and a second network 412 using a step-down converter for each network, in accordance with one or more techniques of this disclosure. First network 402, switching circuitry 404, pre-charging circuitry 406, and second network 412 may be examples of first network 102, switching circuitry 104, pre-charging circuitry 106, and second network 112 of FIG. 1, respectively. As shown in FIG. 4, switching circuitry 404 may include a first n-channel MOSFET 410 and a second n-channel MOSFET 416, which may be examples of switching element 110 and switching element 116 of FIG. 1, respectively. A controller may be configured to control a switching of first n-channel MOSFET 410 and second n-channel MOSFET 416. In some examples, the controller may be configured to control switching element 442 and/or switching element 452.

Pre-charging circuitry 406 may include a first step-down converter formed by first diode 440, switching element 442, inductor 444, and second diode 446. Specifically, first diode 440 may include an anode coupled to first network 402 and a cathode connected to a drain of switching element 442. A source of switching element 442 may be coupled to a cathode of second diode 446 and a first terminal of inductor 444. An anode of second diode 446 is coupled to a reference node (e.g., ground). A second terminal of inductor 444 is coupled to second network 412. The first step-down converter may be configured limit a current flow from first network 402 to second network 412 and to prevent current flow from second network 412 and first network 402.

Similarly, pre-charging circuitry 406 may include a second step-down converter formed by first diode 450, switching element 452, inductor 454, and second diode 456. Specifically, first diode 450 may include an anode coupled to second network 412 and a cathode connected to a drain of switching element 452. A source of switching element 452 may be coupled to a cathode of second diode 456 and a first terminal of inductor 454. An anode of second diode 456 is coupled to a reference node (e.g., ground). A second terminal of inductor 454 is coupled to first network 402. The second step-down converter may be configured limit a current flow from second network 412 to first network 402 and to prevent current flow from first network 402 and second network 412. In this way, pre-charging circuitry 406 may be configured to limit current using the first step-down converter and the second step-down converter, which may limit current with less heat compared to a pre-charging resistor.

Figure 5:
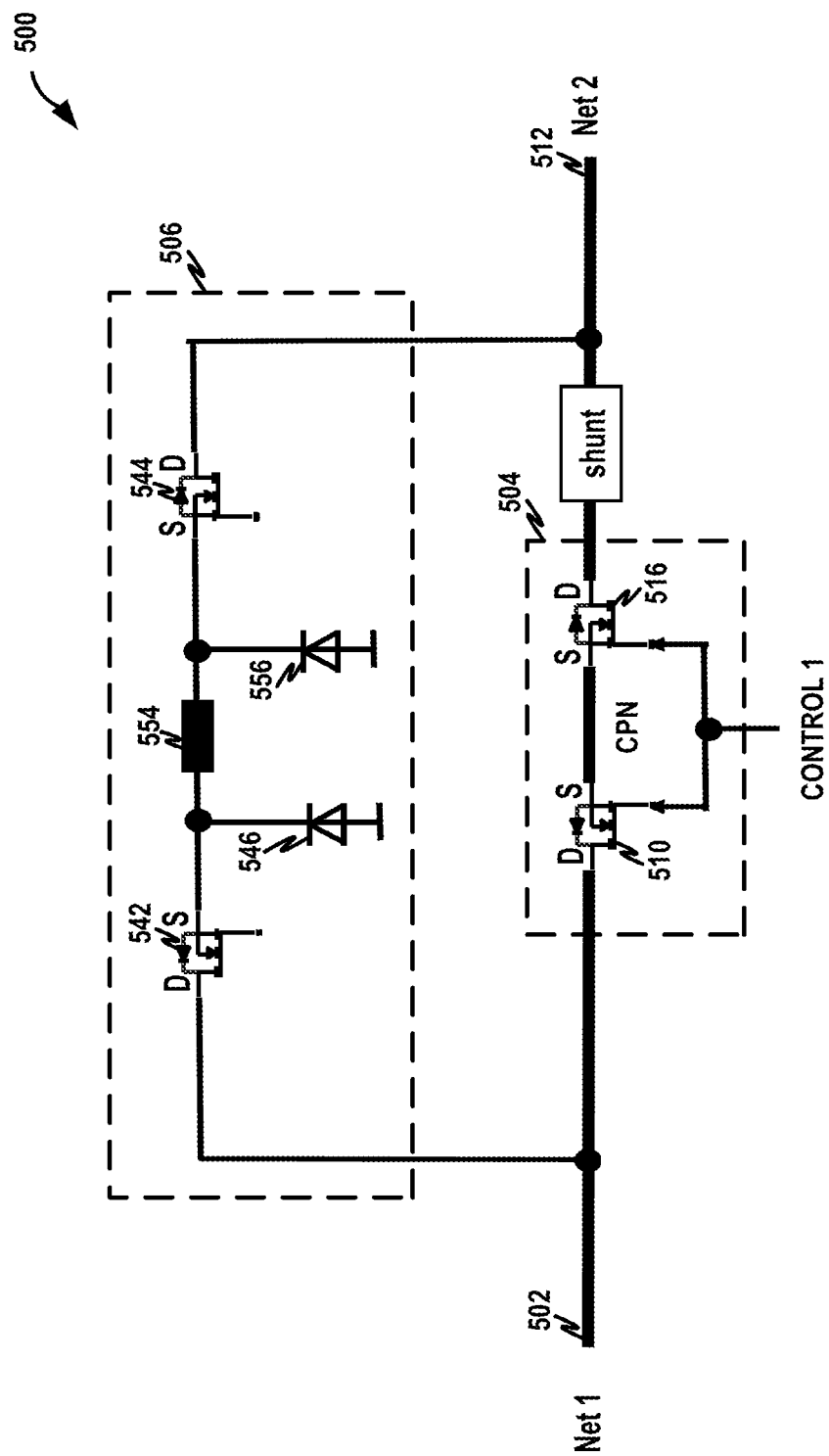
FIG. 5 is a conceptual diagram illustrating an example system configured for connecting a first network and a second network using a switch-based step-down converter, in accordance with one or more techniques of this disclosure.

FIG. 5 is a conceptual diagram illustrating an example system 500 configured for connecting a first network 502 and a second network 512 using a switch-based step-down converter, in accordance with one or more techniques of this disclosure. First network 502, switching circuitry 504, pre-charging circuitry 506, and second network 512 may be examples of first network 102, switching circuitry 104, pre-charging circuitry 106, and second network 112 of FIG. 1, respectively. As shown in FIG. 5, switching circuitry 504 may include a first n-channel MOSFET 510 and a second n-channel MOSFET 516, which may be examples of switching element 110 and switching element 116 of FIG. 1, respectively. A controller may be configured to control a switching of first n-channel MOSFET 510 and second n-channel MOSFET 516. In some examples, the controller may be configured to control switching element 542 and/or switching element 544.

Pre-charging circuitry 506 may include a switch-based step-down converter formed by switching element 542, first diode 546, inductor 554, second diode 456, and second switching element 544. Specifically, switching element 542 may include a drain coupled to first network 502 and a source coupled to a cathode of the first diode 546 and a first terminal of inductor 554. First diode 546 may include an anode coupled to a reference node (e.g., ground). Inductor 554 may include a second terminal coupled to a cathode of second diode 556 and a source of switching element 544. Second diode 556 may include an anode coupled to a reference node (e.g., ground). Switching element 544 may further include a drain coupled to second network 512.

In operation, the switch-based step-down converter may operate switching element 544 in a closed state to operate as a first step-down converter configured limit, using switching element 542, a current flow from first network 502 to second network 512 and to prevent current flow from second network 512 and first network 502. Similarly, the switch-based step-down converter may operate switching element 542 in a closed state to operate as a second step-down converter configured limit, using switching element 544, a current flow from second network 512 to first network 502 and to prevent current flow from first network 502 and second network 512. In this way, pre-charging circuitry 506 may be configured to limit current using the switch-based step-down converter, which may limit current with less heat compared to a pre-charging resistor.

Figure 6:
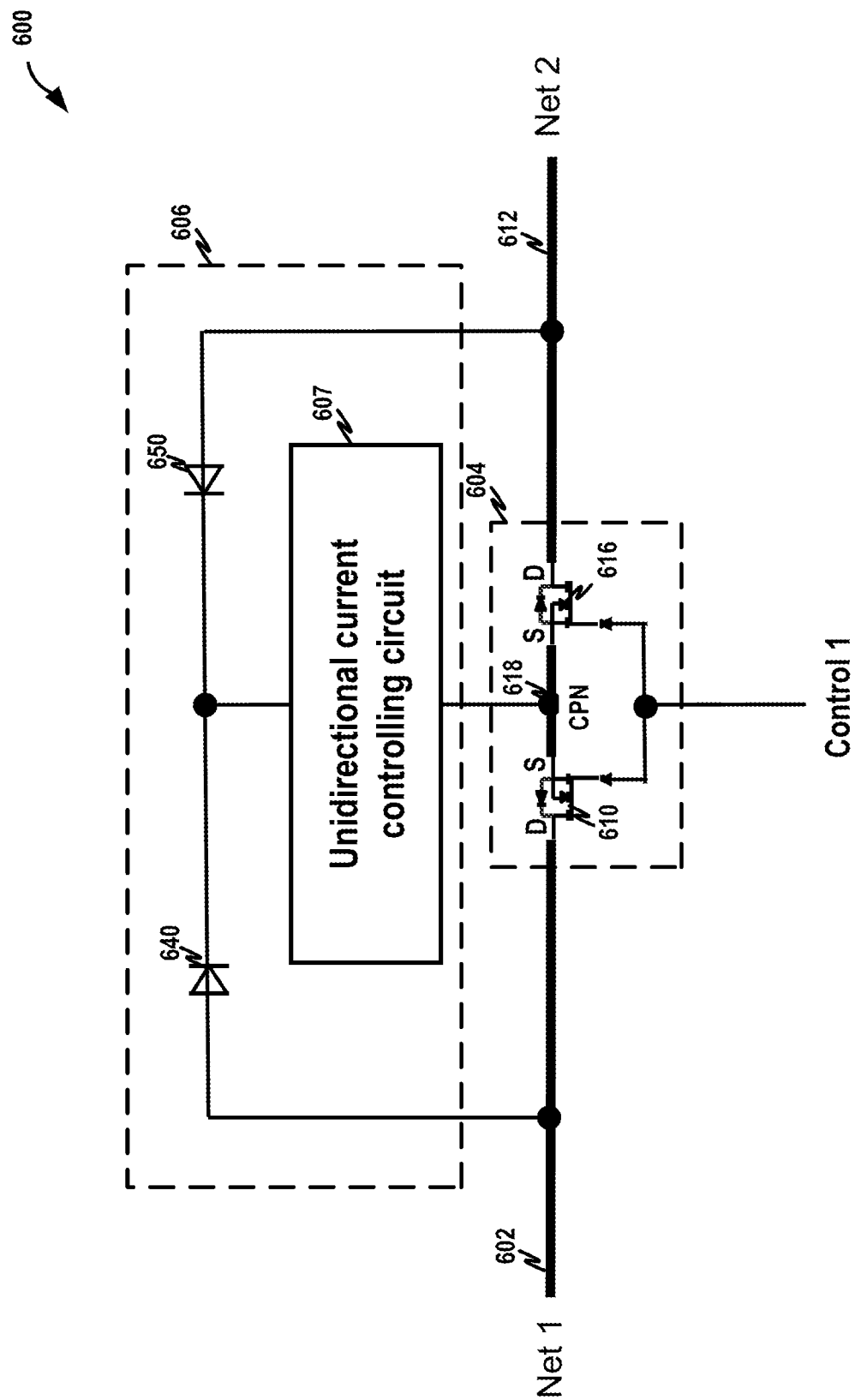
FIG. 6 is a conceptual diagram illustrating a first example system configured for connecting a first network and a second network using passive pre-charging direction control, in accordance with one or more techniques of this disclosure.

FIG. 6 is a conceptual diagram illustrating a first example system 600 configured for connecting a first network 602 and a second network 612 using passive pre-charging direction control, in accordance with one or more techniques of this disclosure. First network 602, switching circuitry 604, pre-charging circuitry 606, and second network 612 may be examples of first network 102, switching circuitry 104, pre-charging circuitry 106, and second network 112 of FIG. 1, respectively. As shown in FIG. 6, switching circuitry 604 may include a first n-channel MOSFET 610 and a second n-channel MOSFET 616, which may be examples of switching element 110 and switching element 116 of FIG. 1, respectively. A controller may be configured to control a switching of first n-channel MOSFET 610 and second n-channel MOSFET 616.

Pre-charging circuitry 606 may include a unidirectional current controlling circuitry 607, first diode 640, and second diode 650. Uni-directional current controlling circuitry 607 may be configured to control current between a first node of uni-directional current controlling circuitry 607 and a second node of uni-directional current controlling circuitry 607. Uni-directional current controlling circuitry 607 may be configured to limit current using, for example, a switched-mode power supply or a linear current source, which may limit current with less heat compared to a pre-charging resistor.

In the example of FIG. 6, the first node of uni-directional current controlling circuitry 607 may be coupled to a cathode of first diode 640 and a cathode of second diode 650. An anode of first diode 640 may be coupled to first network 602.

An anode of second diode 650 may be coupled to second network 612. The second node of the uni-directional current controlling circuitry 607 may be coupled to center point node 618. First diode 640 may be configured to electrically couple first network 602 and the first node of uni-directional current controlling circuitry 607. Second diode 650 may be configured to electrically couple second network 612 and the first node of uni-directional current controlling circuitry 607.

Using center point node 618 may allow pre-charging circuitry 606 to benefit from the current blocking characteristics of switching circuitry 604 to reduce a number of components used for pre-charging circuitry 606. For example, rather than relying on additional switching elements to connect the second terminal of uni-directional current controlling circuitry 607 to the network with a lowest voltage, pre-charging circuitry 606 may use first n-channel MOSFET 610 and second n-channel MOSFET 616 (e.g., intrinsic diodes of first n-channel MOSFET 610 and a second n-channel MOSFET 616) to allow the current to flow to the network with the lower voltage. In this way, a number of components may be reduced compared to systems that do not use center point node 618 to pre-charge.

Figure 7:
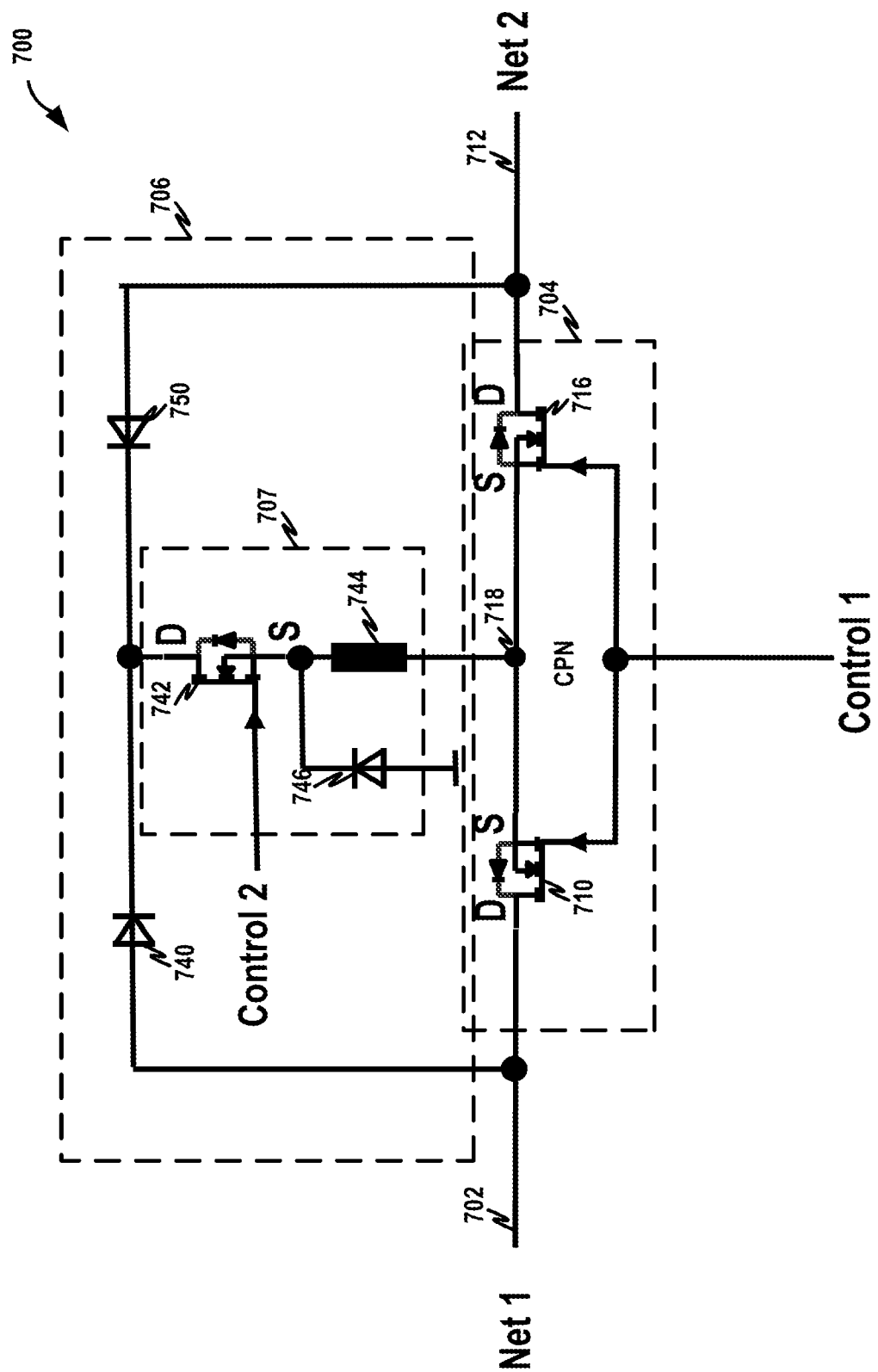
FIG. 7 is a circuit diagram illustrating a first example circuit of the system of FIG. 6, in accordance with one or more techniques of this disclosure.

FIG. 7 is a circuit diagram illustrating a first example circuit 700 of the system 600 of FIG. 6, in accordance with one or more techniques of this disclosure. First network 702, switching circuitry 704, pre-charging circuitry 706, and second network 712 may be examples of first network 102, switching circuitry 104, pre-charging circuitry 106, and second network 112 of FIG. 1, respectively. As shown in FIG. 7, switching circuitry 704 may include a first n-channel MOSFET 710 and a second n-channel MOSFET 716, which may be examples of switching element 110 and switching element 116 of FIG. 1, respectively. A controller may be configured to control a switching of first n-channel MOSFET 710 and second n-channel MOSFET 716.

Pre-charging circuitry 706 may include a unidirectional current controlling circuitry 707, first diode 740, and second diode 750. Uni-directional current controlling circuitry 707 may be configured to control current between a first node of uni-directional current controlling circuitry 707 and a second node of uni-directional current controlling circuitry 707. Uni-directional current controlling circuitry 707 may comprise a switched-mode power supply configured to limit the current to center point node 718.

In the example of FIG. 7, the first node of uni-directional current controlling circuitry 707 may be coupled to a cathode of first diode 740 and a cathode of second diode 750. The second node of uni-directional current controlling circuitry 707 may be coupled to center point node 718. First diode 740 may be configured to electrically couple first network 702 and the first node of uni-directional current controlling circuitry 707. Second diode 750 may be configured to electrically couple second network 712 and the first node of uni-directional current controlling circuitry 707.

In the example of FIG. 7, uni-directional current controlling circuitry 707 comprises a third switching element 742, an inductive element 744, and a fourth diode 746. Third switching element 742 may comprise a drain coupled to first diode 740 (e.g., a cathode of first diode 740) and second diode 750 (e.g., a cathode of second diode 750). Inductive element 744 may comprise a first node coupled to the source of third switching element 742 and a second node coupled to center point node 718. Fourth diode 746 may comprise an anode coupled to a reference node (e.g., ground) and a cathode coupled to the first node of inductive element 744. Processing circuitry (e.g., a controller) may control third switching element 742 to regulate current through third switching element 742. In this way, uni-directional current controlling circuitry 707 may form a switched-mode power supply configured to limit the current to center point node 718, which may limit current with less heat compared to a pre-charging resistor.

Figure 8:
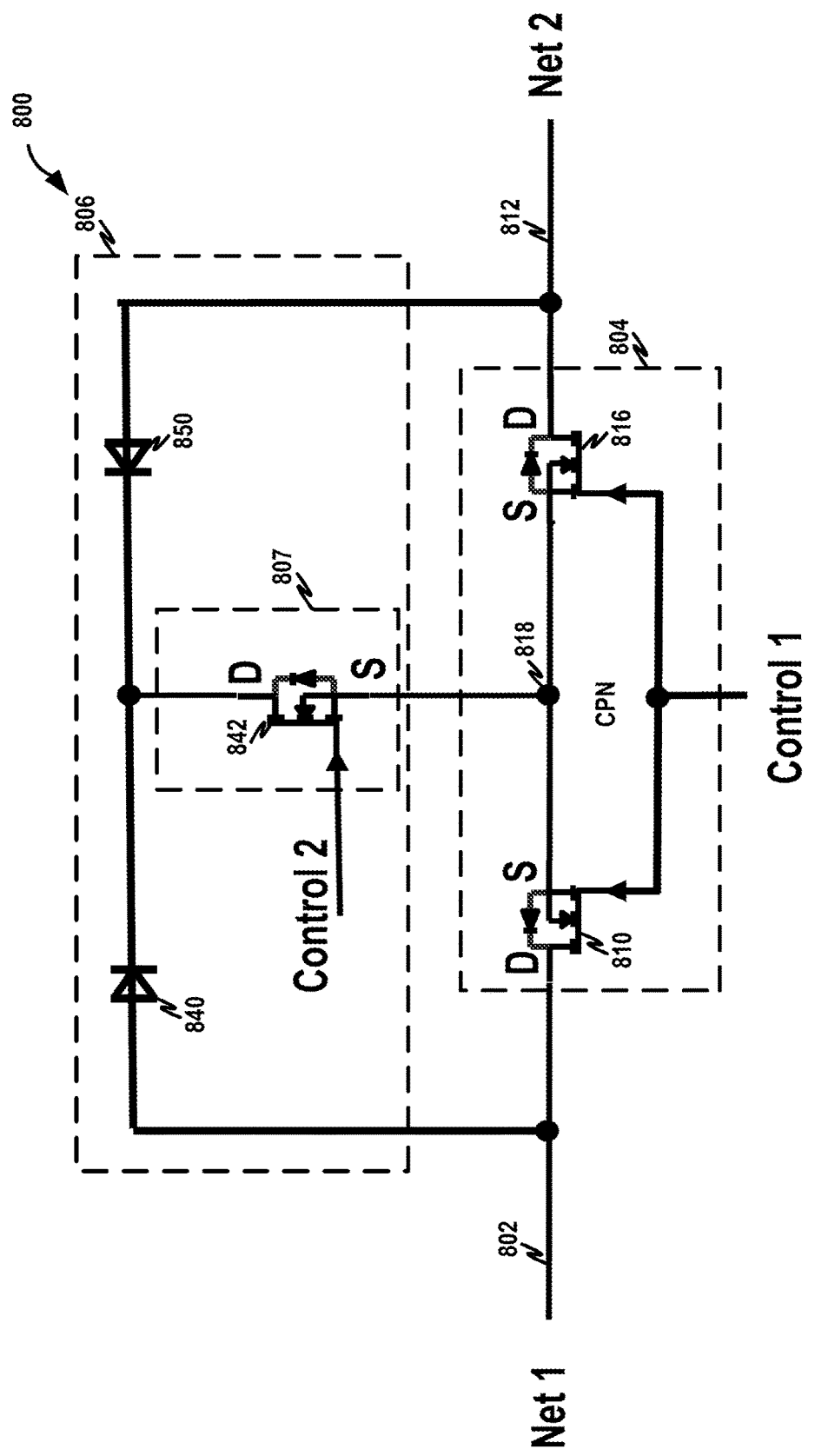
FIG. 8 is a circuit diagram illustrating a second example circuit of the system of FIG. 6, in accordance with one or more techniques of this disclosure.

FIG. 8 is a circuit diagram illustrating a second example circuit 800 of system 600 of FIG. 6, in accordance with one or more techniques of this disclosure. First network 802, switching circuitry 804, pre-charging circuitry 806, and second network 812 may be examples of first network 102, switching circuitry 104, pre-charging circuitry 106, and second network 112 of FIG. 1, respectively. As shown in FIG. 8, switching circuitry 804 may include a first n-channel MOSFET 810 and a second n-channel MOSFET 816, which may be examples of switching element 110 and switching element 116 of FIG. 1, respectively.

Pre-charging circuitry 806 may include a unidirectional current controlling circuitry 807, first diode 840, and second diode 850. Uni-directional current controlling circuitry 807 may be configured to control current between a first node of the uni-directional current controlling circuitry and a second node of uni-directional current controlling circuitry 807. Uni-directional current controlling circuitry 807 may comprise a linear current source configured to limit the current to center point node 818.

In the example of FIG. 8, the first node of uni-directional current controlling circuitry 807 may be coupled to a cathode of first diode 840 and a cathode of second diode 850. The second node of uni-directional current controlling circuitry 807 may be coupled to center point node 818. First diode 840 may be configured to electrically couple first network 802 and the first node of uni-directional current controlling circuitry 807. Second diode 850 may be configured to electrically couple second network 812 and the first node of uni-directional current controlling circuitry 807.

In the example of FIG. 8, uni-directional current controlling circuitry 807 comprises a third switching element 842. The third switching element 842 may comprise a drain coupled to first diode 840 (e.g., a cathode of first diode 840) and second diode 850 (e.g., a cathode of second diode 850) and comprise a source coupled to center point node 818. Processing circuitry (e.g., a controller) may control third switching element 842 as a linear current source. In this way, uni-directional current controlling circuitry 807 may form a linear current source configured to limit the current to center point node 818, which may limit current with less heat compared to a pre-charging resistor.

Figure 9:
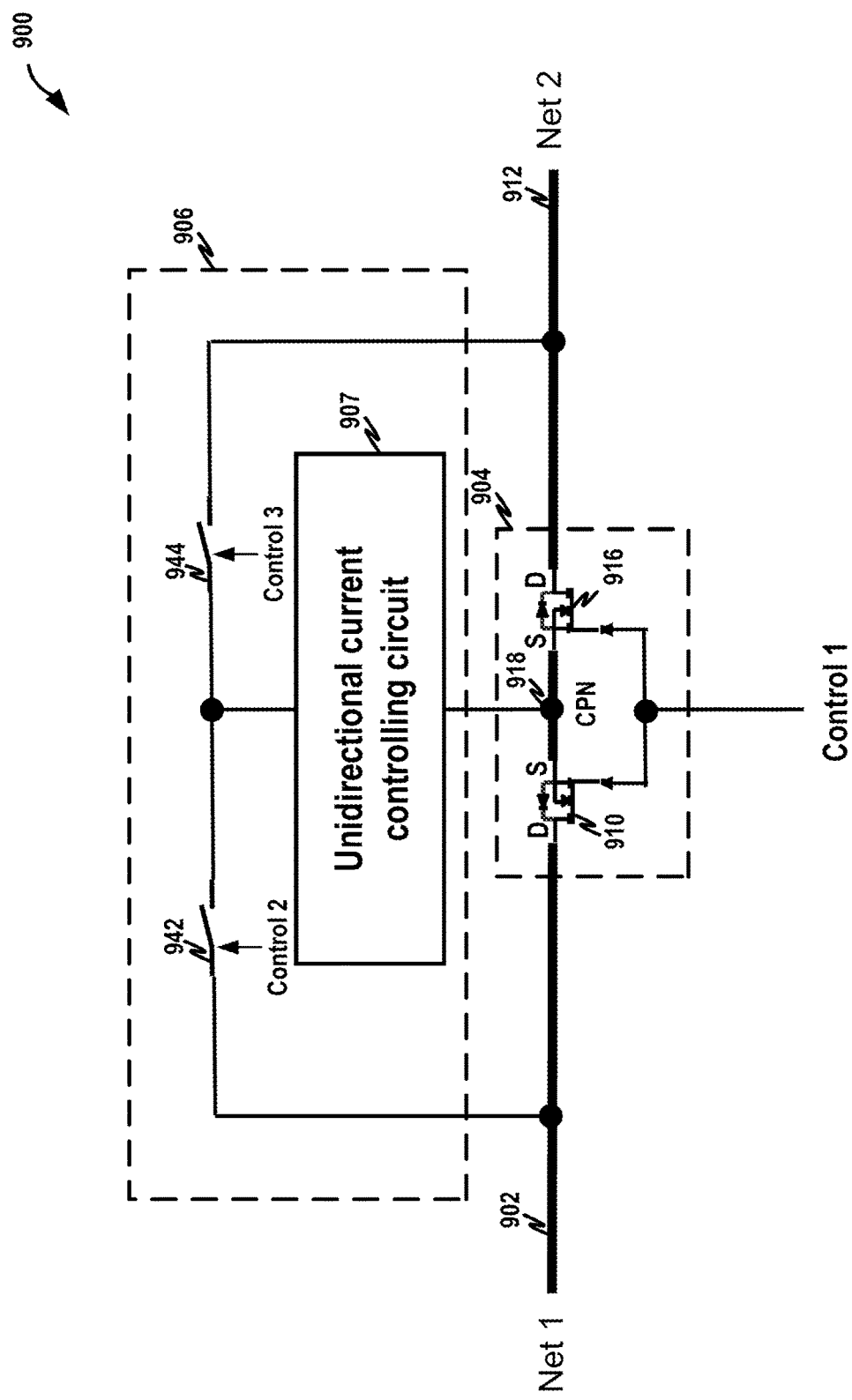
FIG. 9 is a conceptual diagram illustrating an example system configured for connecting a first network and a second network using active pre-charging direction control, in accordance with one or more techniques of this disclosure.

FIG. 9 is a conceptual diagram illustrating a first example system 900 configured for connecting a first network 902 and a second network 912 using active pre-charging direction control, in accordance with one or more techniques of this disclosure. First network 902, switching circuitry 904, pre-charging circuitry 906, and second network 912 may be examples of first network 102, switching circuitry 104, pre-charging circuitry 106, and second network 112 of FIG. 1, respectively. As shown in FIG. 9, switching circuitry 904 may include a first n-channel MOSFET 910 and a second n-channel MOSFET 916, which may be examples of switching element 110 and switching element 116 of FIG. 1, respectively. A controller may be configured to control a switching of first n-channel MOSFET 910 and second n-channel MOSFET 916.

Pre-charging circuitry 906 may include a unidirectional current controlling circuitry 907, a first bi-directionally blocking switching element 942, and a second bi-directionally blocking switching element 944. First bi-directionally blocking switching element 942 may be configured to electrically couple first network 902 and a first node of uni-directional current controlling circuitry 907. First bi-directionally blocking switching element 942 may block current in both directions when operating in an open state (e.g., an off state). Second bi-directionally blocking switching element 944 may be configured to electrically couple second network 912 and the first node of uni-directional current controlling circuitry 907. Second bi-directionally blocking switching element 944 may block current in both directions when operating in an open state (e.g., an off state).

Uni-directional current controlling circuitry 907 may be configured to control current between a first node of uni-directional current controlling circuitry 907 and a second node of uni-directional current controlling circuitry 907. A controller may be configured to control a switching of first bi-directionally blocking switching element 942 and second bi-directionally blocking switching element 944. Uni-directional current controlling circuitry 907 may be configured to limit current using, for example, a switched-mode power supply, which may limit current with less heat compared to a pre-charging resistor.

In FIG. 9, the first node of uni-directional current controlling circuitry 907 may be coupled to first bi-directionally blocking switching element 942 and a second bi-directionally blocking switching element 944. The second node of the uni-directional current controlling circuitry 907 may be coupled to center point node 918. Using center point node 918 may allow pre-charging circuitry 906 to benefit from the current blocking characteristics of switching circuitry 904 to reduce a number of components used for pre-charging circuitry 906. For example, rather than relying on additional switching elements to connect the second terminal of uni-directional current controlling circuitry 907 to the network with a lowest voltage, pre-charging circuitry 906 may use first n-channel MOSFET 910 and second n-channel MOSFET 916 (e.g., intrinsic diodes of first n-channel MOSFET 910 and second n-channel MOSFET 816) to allow the current to flow to the network with the lower voltage. In this way, a number of components may be reduced compared to systems that do not use center point node 918 to pre-charge.

Figure 10:
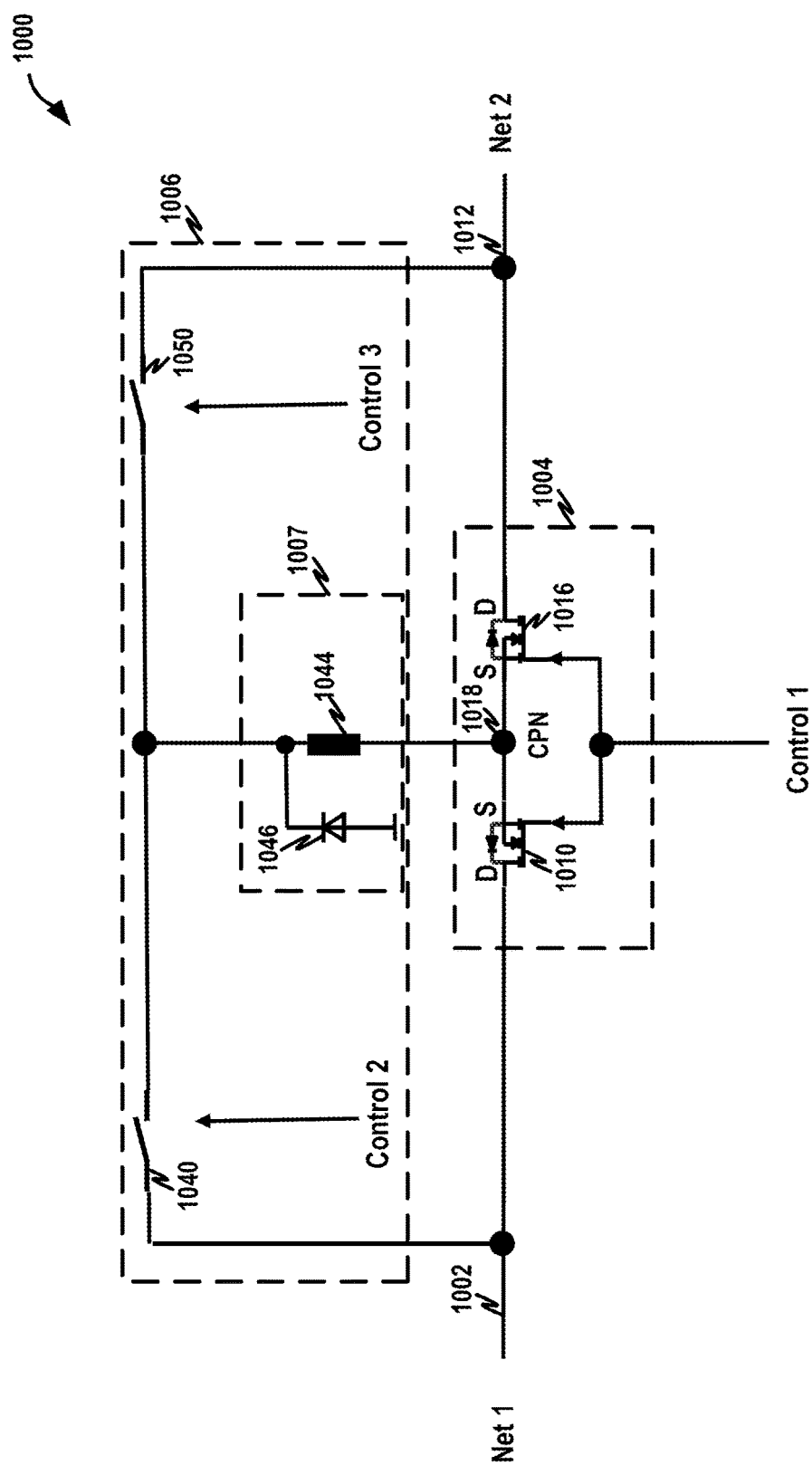
FIG. 10 is a circuit diagram illustrating an example circuit of the system of FIG. 9, in accordance with one or more techniques of this disclosure.

FIG. 10 is a circuit diagram illustrating an example circuit 1000 of system 900 of FIG. 9, in accordance with one or more techniques of this disclosure. First network 902, switching circuitry 1004, pre-charging circuitry 1006, and second network 1012 may be examples of first network 102, switching circuitry 104, pre-charging circuitry 106, and second network 112 of FIG. 1, respectively. As shown in FIG. 10, switching circuitry 1004 may include a first n-channel MOSFET 1010 and a second n-channel MOSFET 1016, which may be examples of switching element 110 and switching element 116 of FIG. 1, respectively. A controller may be configured to control a switching of first n-channel MOSFET 1010 and second n-channel MOSFET 1016.

Pre-charging circuitry 1006 may include a unidirectional current controlling circuitry 1007, a first bi-directionally blocking switching element 1042, and a second bi-directionally blocking switching element 1044. First bi-directionally blocking switching element 1042 may be configured to electrically couple first network 1002 and a first node of uni-directional current controlling circuitry 1007. Second bi-directionally blocking switching element 1044 may be configured to electrically couple second network 1012 and the first node of uni-directional current controlling circuitry 1007. As shown, the first node of uni-directional current controlling circuitry 1007 may be coupled to first bi-directionally blocking switching element 1042 and a second bi-directionally blocking switching element 1044. The second node of the uni-directional current controlling circuitry 1007 may be coupled to center point node 1018.

In the example of FIG. 10, uni-directional current controlling circuitry 1007 comprises a switched-mode power supply configured to limit the current to center point node 1018. For example, uni-directional current controlling circuitry 1007 may comprise an inductive element 1044 and a diode 1046. Inductive element 1044 may comprise a first node coupled to the first node of uni-directional current controlling circuitry 1007 and a second node coupled to center point node 1018. Diode 1046 may comprise an anode coupled to a reference node (e.g., ground) and a cathode coupled to the first node of inductive element 1044. Processing circuitry (e.g., a controller) may control first bi-directionally blocking switching element 1040 and a second bi-directionally blocking switching element 1050 to regulate current through inductive element 1044. In this way, uni-directional current controlling circuitry 1007 may form a switched-mode power supply configured to limit the current to center point node 1018, which may limit current with less heat compared to a pre-charging resistor.

While the example of FIG. 10 includes both first bi-directionally blocking switching element 1042 and second bi-directionally blocking switching element 1044, some examples may use only one of first bi-directionally blocking switching element 1042 and second bi-directionally blocking switching element 1044 based on a direction of current flow.

Figure 11:
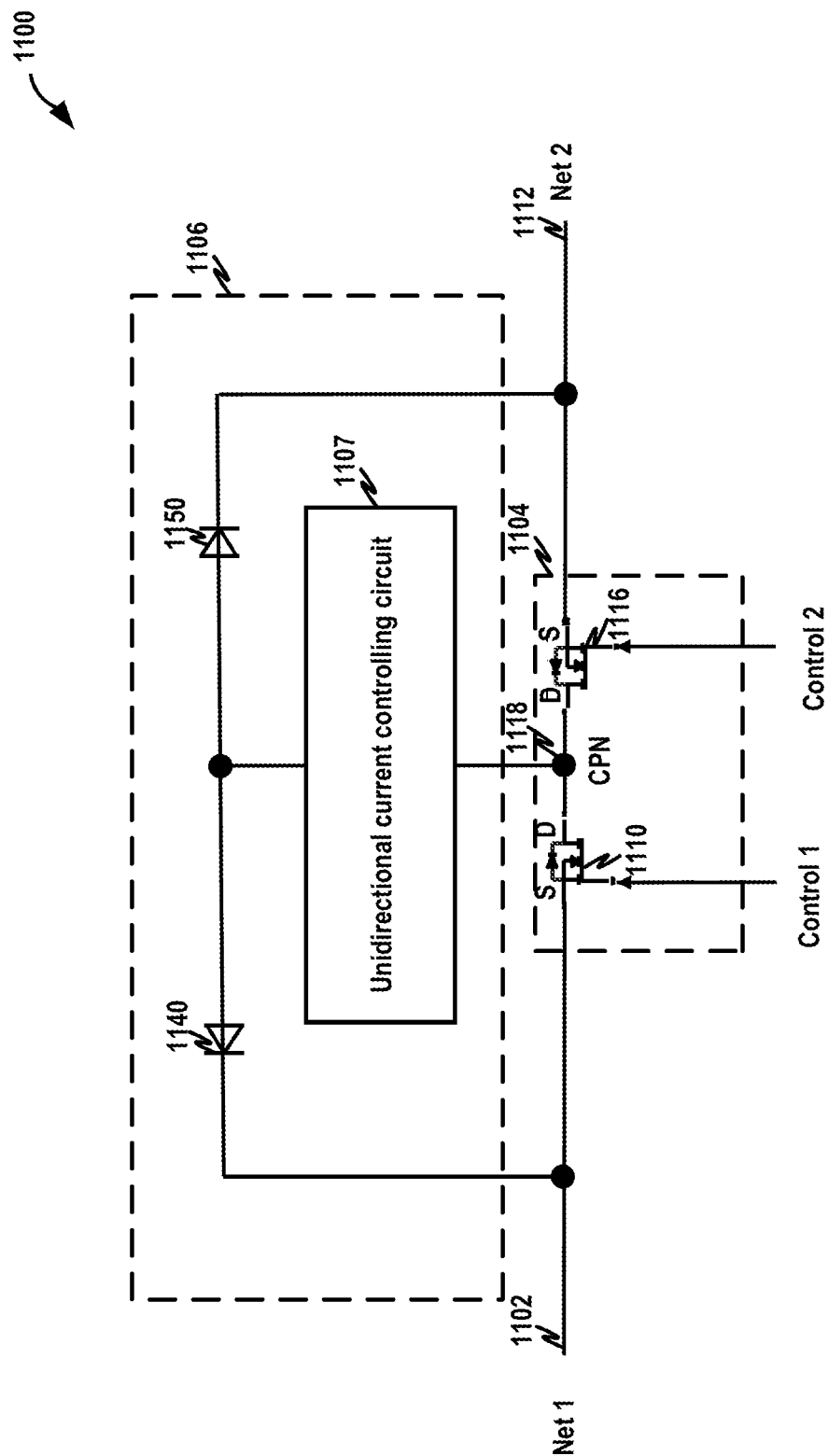
FIG. 11 is a conceptual diagram illustrating a second example system configured for connecting a first network and a second network using passive pre-charging direction control, in accordance with one or more techniques of this disclosure.

FIG. 11 is a conceptual diagram illustrating a second example system 1100 configured for connecting a first network 1102 and a second network 1112 using passive pre-charging direction control, in accordance with one or more techniques of this disclosure. First network 1102, switching circuitry 1104, pre-charging circuitry 1106, and second network 1112 may be examples of first network 102, switching circuitry 104, pre-charging circuitry 106, and second network 112 of FIG. 1, respectively. As shown in FIG. 11, switching circuitry 1104 may include a first n-channel MOSFET 1110 and a second n-channel MOSFET 1116, which may be examples of switching element 110 and switching element 116 of FIG. 1, respectively. A controller may be configured to control a switching of first n-channel MOSFET 1110 and second n-channel MOSFET 1116.

Pre-charging circuitry 1106 may include a unidirectional current controlling circuitry 1107, first diode 1140, and second diode 1150. Uni-directional current controlling circuitry 1107 may be configured to control current between a first node of the uni-directional current controlling circuitry and a second node of uni-directional current controlling circuitry 1107. Uni-directional current controlling circuitry 1107 may be configured to limit current using, for example, a switched-mode power supply or a linear current source, which may limit current with less heat compared to a pre-charging resistor.

In the example of FIG. 11, the first node of uni-directional current controlling circuitry 1107 may be coupled to an anode of first diode 1140 and an anode of second diode 1150. A cathode of first diode 1140 may be coupled to first network 602. A cathode of second diode 1150 may be coupled to second network 612. The second node of the uni-directional current controlling circuitry 1107 may be coupled to center point node 1118. First diode 1140 may be configured to electrically couple first network 1102 and the first node of uni-directional current controlling circuitry 1107. Second diode 1150 may be configured to electrically couple second network 1112 and the first node of uni-directional current controlling circuitry 1107.

Using center point node 1118 may allow pre-charging circuitry 1106 to benefit from the current blocking characteristics of switching circuitry 1104 to reduce a number of components used for pre-charging circuitry 1106. For example, rather than relying on additional switching elements to connect the second terminal of uni-directional current controlling circuitry 1107 to the network with a highest voltage, pre-charging circuitry 1106 may use first n-channel MOSFET 1110 and second n-channel MOSFET 1116 (e.g., intrinsic diodes of first n-channel MOSFET 1110 and a second n-channel MOSFET 1116) to allow the current to flow from the network with the higher voltage. In this way, a number of components may be reduced compared to systems that do not use center point node 1118 to pre-charge.

Figure 12:
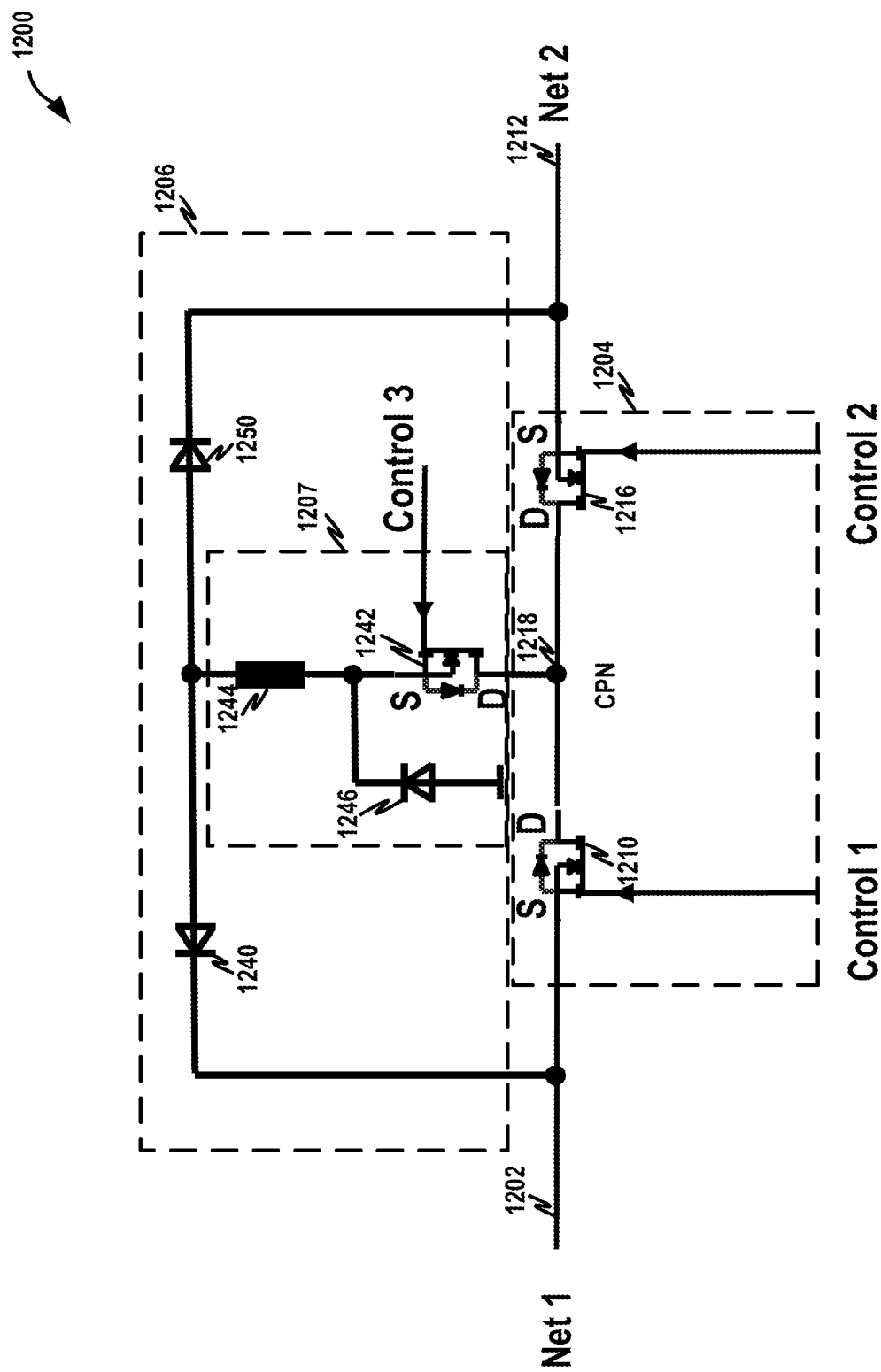
FIG. 12 is a circuit diagram illustrating a first example circuit of the system of FIG. 11, in accordance with one or more techniques of this disclosure.

FIG. 12 is a circuit diagram illustrating a first example circuit 1200 of system 1100 of FIG. 11, in accordance with one or more techniques of this disclosure. First network 1202, switching circuitry 1204, pre-charging circuitry 1206, and second network 1212 may be examples of first network 102, switching circuitry 104, pre-charging circuitry 106, and second network 112 of FIG. 1, respectively. As shown in FIG. 12, switching circuitry 1204 may include a first n-channel MOSFET 1210 and a second n-channel MOSFET 1216, which may be examples of switching element 110 and switching element 116 of FIG. 1, respectively. A controller may be configured to control a switching of first n-channel MOSFET 1210 and second n-channel MOSFET 1216.

Pre-charging circuitry 1206 may include a unidirectional current controlling circuitry 1207, first diode 1240, and second diode 1250. Uni-directional current controlling circuitry 1207 may be configured to control current between a first node of uni-directional current controlling circuitry 1207 and a second node of uni-directional current controlling circuitry 1207. Uni-directional current controlling circuitry 1207 may comprise a switched-mode power supply configured to limit the current to center point node 1218.

In FIG. 12, the first node of uni-directional current controlling circuitry 1207 may be coupled to an anode of first diode 1240 and an anode of second diode 1250. The second node of uni-directional current controlling circuitry 1207 may be coupled to center point node 1218. First diode 1240 may be configured to electrically couple first network 1202 and the first node of uni-directional current controlling circuitry 1207. Second diode 1250 may be configured to electrically couple second network 1212 and the first node of uni-directional current controlling circuitry 1207.

In the example of FIG. 12, uni-directional current controlling circuitry 1207 may comprise a third switching element 1242, an inductive element 1244, and a fourth diode 1246. Inductive element 1244 may comprise a first node coupled to first diode 1240 (e.g., an anode of first diode 1240) and second diode 1250 (e.g., an anode of second diode 1250). Third switching element 1242 may comprise a source coupled to the second node of inductive element 1244 and a drain coupled to center point node 1218. Fourth diode 1246 may comprise an anode coupled to a reference node (e.g., ground) and a cathode coupled to the second node of inductive element 1244. Processing circuitry (e.g., a controller) may control third switching element 1242 to regulate current through inductive element 1244. In this way, uni-directional current controlling circuitry 1207 may form a switched-mode power supply configured to limit the current to center point node 1218, which may limit current with less heat compared to a pre-charging resistor.

Figure 13:
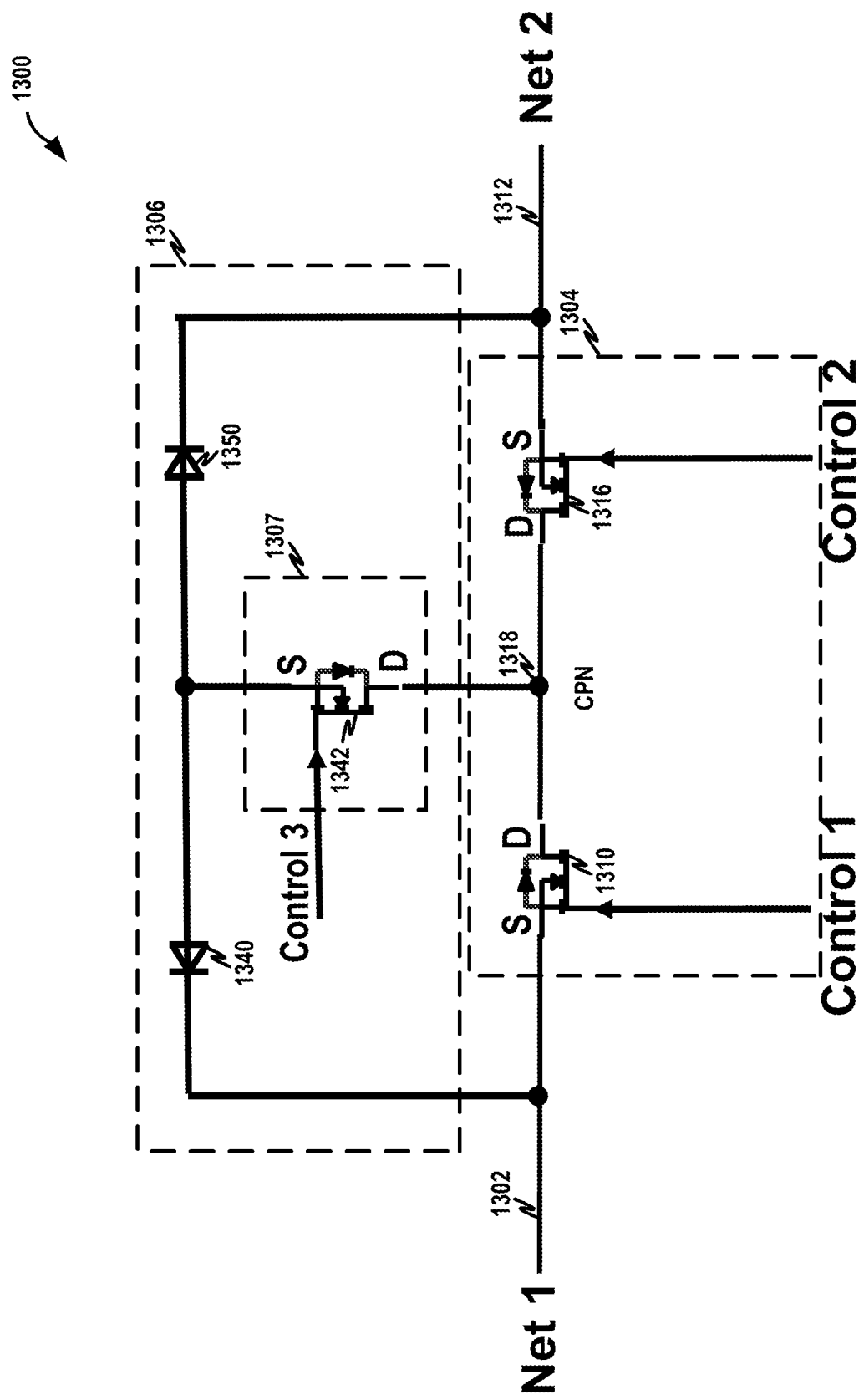
FIG. 13 is a circuit diagram illustrating a second example circuit of the system of FIG. 11, in accordance with one or more techniques of this disclosure.

FIG. 13 is a circuit diagram illustrating a second example circuit 1300 of system 1100 of FIG. 11, in accordance with one or more techniques of this disclosure. First network 1302, switching circuitry 1304, pre-charging circuitry 1306, and second network 1312 may be examples of first network 102, switching circuitry 104, pre-charging circuitry 106, and second network 112 of FIG. 1, respectively. As shown in FIG. 13, switching circuitry 1304 may include a first n-channel MOSFET 1310 and a second n-channel MOSFET 1316, which may be examples of switching element 110 and switching element 116 of FIG. 1, respectively. A controller may be configured to control a switching of first n-channel MOSFET 1310 and second n-channel MOSFET 1316.

Pre-charging circuitry 1306 may include a unidirectional current controlling circuitry 1307, first diode 1340, and second diode 1350. Uni-directional current controlling circuitry 1307 may be configured to control current between a first node of uni-directional current controlling circuitry 1307 and a second node of uni-directional current controlling circuitry 1307. Uni-directional current controlling circuitry 1307 may comprises a linear current source configured to limit the current to center point node 1318.

In FIG. 13, the first node of uni-directional current controlling circuitry 1307 may be coupled to an anode of first diode 1340 and an anode of second diode 1350. The second node of uni-directional current controlling circuitry 1307 may be coupled to center point node 1318. First diode 1340 may be configured to electrically couple first network 1302 and the first node of uni-directional current controlling circuitry 1307. Second diode 1350 may be configured to electrically couple second network 1312 and the first node of uni-directional current controlling circuitry 1307.

In the example of FIG. 13, uni-directional current controlling circuitry 1307 may comprise a third switching element 1342. The third switching element 1342 may comprise a drain coupled to center point node 1318 and comprise a source coupled to first diode 1340 (e.g., an anode of first diode 840) and second diode 850 (e.g., an anode of second diode 1350). Processing circuitry (e.g., a controller) may control third switching element 1342 as a linear current source. In this way, uni-directional current controlling circuitry 1307 may form a linear current source configured to limit the current to center point node 1318, which may limit current with less heat compared to a pre-charging resistor.

Figure 14:
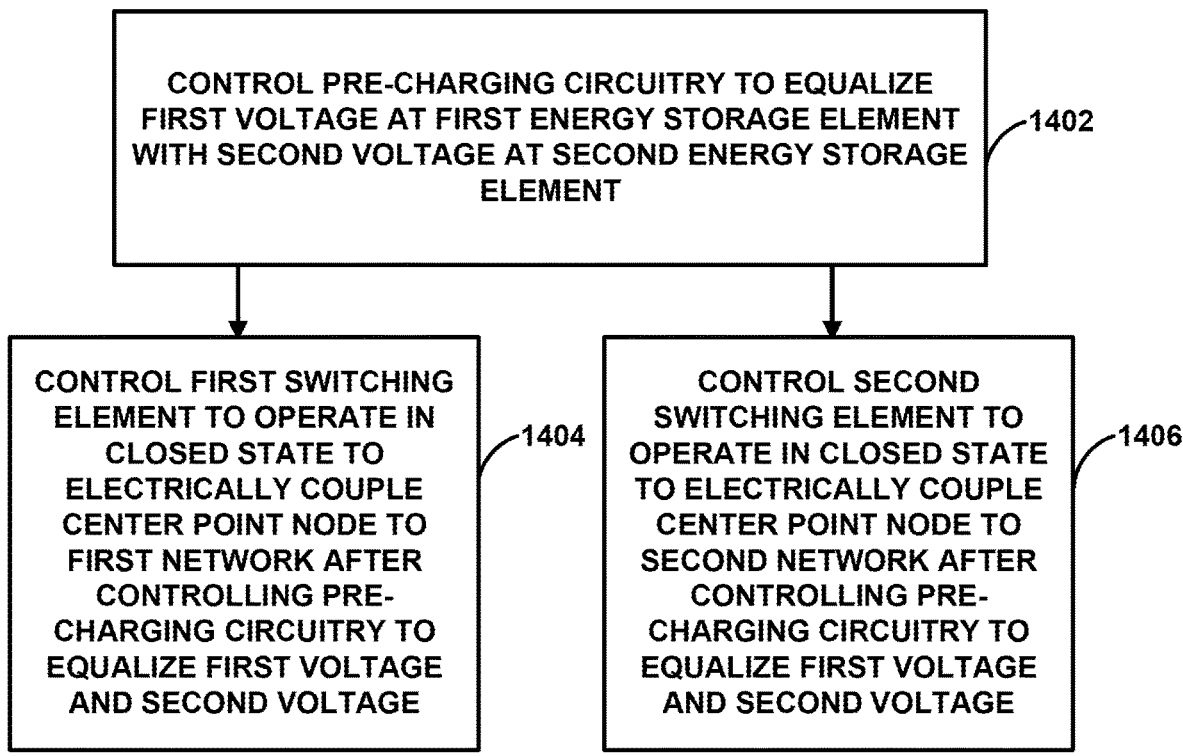
FIG. 14 is a flow diagram consistent with techniques that may be performed by the example system of FIG. 1, in accordance with this disclosure.

FIG. 14 is a flow diagram consistent with techniques that may be performed by the example system of FIG. 1, in accordance with this disclosure. FIG. 14 is discussed with reference to FIGS. 1-13 for example purposes only although the techniques of FIG. 14 may be used with other systems or devices.

In accordance with the techniques of the disclosure, processing circuitry (e.g., a controller) may control the pre-charging circuitry to equalize a first voltage at first energy storage element 103 with a second voltage at second energy storage element 113 (1402). For example, pre-charging circuitry 106 may comprise a switched-mode power supply configured to limit the current to center point node 118 (e.g., see FIGS. 7, 10, and 12). In some examples, pre-charging circuitry 106 may comprise a linear current source configured to limit the current to center point node 118 (e.g., see FIGS. 8 and 13).

The processing circuitry may operate pre-charging circuitry 106 to equalize a first voltage at first energy storage element 103 with a second voltage at second energy storage element 113 when changing from a disconnected state (e.g., when first switching element 110 and second switching element 116 are in open states) to a connected state (e.g., when first switching element 110 and second switching element 116 are in closed states) and when a difference in voltage between the first voltage and the second voltage is greater than a threshold. The processing circuitry may control first switching element 110 and second switching element 116 to operate in open states while pre-charging circuitry 106 is controlled to equalize the first voltage and the second voltage.

The processing circuitry may control first switching element 110 to operate in a closed state to electrically couple center point node 118 to first network 102 after pre-charging circuitry 106 is controlled to equalize the first voltage and the second voltage (1404). For example, the processing circuitry may control first switching element 110 to operate in a closed state when changing from a disconnected state to a connected state and when a difference in voltage between the first voltage and the second voltage is less than a threshold (e.g., the voltages have been equalized).

The processing circuitry may control second switching element 116 to operate in a closed state to electrically couple center point node 118 to second network 112 after pre-charging circuitry 106 is controlled to equalize the first voltage and the second voltage (1406). For example, the processing circuitry may control second switching element 116 to operate in a closed state when changing from a disconnected state to a connected state and when a difference in voltage between the first voltage and the second voltage is less than a threshold (e.g., the voltages have been equalized).

The processing circuitry may concurrently control first switching element 110 and second switching element 116 to operate in the closed state. For example, the processing circuitry may be configured to generate a control signal at an output node, where the output node is coupled to a gate of first switching element 110 and a gate of second switching element 116.

The processing circuitry may separately control first switching element 110 and second switching element 116 to operate in the closed state. For example, the processing circuitry may be configured to generate a first control signal at a first output node, where the first output node is coupled to a gate of first switching element 110. In this example, the processing circuitry may be configured to generate a second control signal at a second output node different from the first output node, where the second output node is coupled to a gate of second switching element 116.

The processing circuitry may generate the first control signal and the second control signal to control first switching element 110 and second switching element 116 to operate in the closed state concurrently or sequentially. For example, the processing circuitry may generate the first signal to cause first switching element 110 to operate in the closed state concurrently with causing second switching element 116 to operate in the closed state. In some examples, the processing circuitry may generate the first signal to cause first switching element 110 to operate in the closed state before causing second switching element 116 to operate in the closed state. The processing circuitry may generate the first signal to cause first switching element 110 to operate in the closed state after with causing second switching element 116 to operate in the closed state.

The following examples may illustrate one or more aspects of the disclosure.

Example 1: A device for connecting a first network comprising a first energy storage element and a second network comprising a second energy storage element, the device comprising: switching circuitry configured to electrically couple the first network and the second network, the switching circuitry comprising: a first switching element configured to bi-directionally allow current between the first network and a center point node when operating in a closed state and to block current in one direction between the first network and the center point node when operating in an open state; and a second switching element configured to bi-directionally allow current between the second network and the center point node when operating in a closed state and to block current in one direction between the second network and the center point node when operating in an open state; and pre-charging circuitry configured to limit current to the center point node when a first voltage at the first energy storage element equalizes with a second voltage at the second energy storage element.

Example 2: The device of example 1, wherein the first energy storage element comprises one or more of a first capacitor or a first battery; and wherein the second energy storage element comprises one or more of a second capacitor or a second battery.

Example 3: The device of any of examples 1 and 2, wherein the pre-charging circuitry comprises: uni-directional current controlling circuitry configured to control current between a first node of the uni-directional current controlling circuitry and a second node of the uni-directional current controlling circuitry, wherein the second node of the uni-directional current controlling circuitry is coupled to the center point node; a first diode configured to electrically couple the first network and the first node of the uni-directional current controlling circuitry; and a second diode configured to electrically couple the second network and the first node of the uni-directional current controlling circuitry.

Example 4: The device of example 3, wherein the uni-directional current controlling circuitry comprises a switched-mode power supply (SMPS) configured to limit the current to the center point node.

Example 5: The device of any of examples 3 and 4, wherein the uni-directional current controlling circuitry comprises: a third switching element comprising a drain coupled to the first diode and the second diode and comprising a source; an inductive element comprising a first node coupled to the source of the third switching element and a second node coupled to the center point node; and a fourth diode comprising an anode coupled to a reference node and a cathode coupled to the first node of the inductive element.

Example 6: The device of any of examples 3 and 4, wherein the uni-directional current controlling circuitry comprises: an inductive element comprising a first node coupled to the first diode and the second diode and a second node; a third switching element comprising a source coupled to the second node of the inductive element and a drain coupled to the center point node; and a fourth diode comprising an anode coupled to a reference node and a cathode coupled to the second node of the inductive element.

Example 7: The device of example 3, wherein the uni-directional current controlling circuitry comprises a linear current source configured to limit the current to the center point node.

Example 8: The device of any of examples 3 and 7, wherein the uni-directional current controlling circuitry comprises: a third switching element comprising a drain coupled to the first diode and the second diode and comprising a source coupled to the center point node.

Example 9: The device of any of examples 3 and 7, wherein the uni-directional current controlling circuitry comprises: a third switching element comprising a drain coupled to the center point node and comprising a source coupled to the first diode and the second diode.

Example 10: The device of any of examples 3 through 9, wherein the first diode comprises an anode coupled to the first network and a cathode coupled to the first node of the uni-directional current controlling circuitry; and wherein the second diode comprises an anode coupled to the second network and a cathode coupled to the first node of the uni-directional current controlling circuitry.

Example 11: The device of any of examples 3 through 9, wherein the first diode comprises an anode coupled to the first node of the uni-directional current controlling circuitry and a cathode coupled to the first network; and wherein the second diode comprises an anode coupled to the first node of the uni-directional current controlling circuitry and a cathode coupled to the second network.

Example 12: The device of any of examples 1 through 2, wherein the pre-charging circuitry comprises: a first bi-directionally blocking switching element configured to electrically couple the first network and a first node of the uni-directional current controlling circuitry; a second bi-directionally blocking switching element configured to electrically couple the second network and the first node of the uni-directional current controlling circuitry; and the uni-directional current controlling circuitry further comprising a second node coupled to the center point node.

Example 13: The device of example 12, wherein the uni-directional current controlling circuitry comprises a switched-mode power supply (SMPS) configured to limit the current to the center point node.

Example 14: The device of any of examples 12 and 13, wherein the uni-directional current controlling circuitry comprises: an inductive element comprising a first node coupled to the first node of the uni-directional current controlling circuitry and a second node coupled to the center point node; and a diode comprising an anode coupled to a reference node and a cathode coupled to the first node of the inductive element.

Example 15: The device of any of examples 1 through 14, wherein the first switching element comprises a first n-channel metal-oxide-semiconductor field-effect transistor (MOSFET) transistor comprising a source coupled to the first network and a drain coupled to the center point node, wherein the first n-channel MOSFET comprises a first intrinsic diode comprising an anode coupled to the first network and a cathode coupled to the center point node; and wherein the second switching element comprises a second n-channel MOSFET comprising a drain coupled to the center point node and a source coupled to the second network, wherein the second n-channel MOSFET comprises a second intrinsic diode comprising an anode coupled to the second network and a cathode coupled to the center point node.

Example 16: The device of any of examples 1 through 14, wherein the first switching element comprises a first n-channel metal-oxide-semiconductor field-effect transistor (MOSFET) transistor comprising a drain coupled to the first network and a source coupled to the center point node, wherein the first n-channel MOSFET comprises a first intrinsic diode comprising an anode coupled to the center point node and a cathode coupled to the first network; and wherein the first switching element comprises a second n-channel MOSFET comprising a source coupled to the center point node and a drain coupled to the second network, wherein the second n-channel MOSFET comprises a second intrinsic diode comprising an anode coupled to the center point node and a cathode coupled to the second network.

Example 17: The device of any of examples 1 through 16 includes control the pre-charging circuitry to equalize a first voltage at the first energy storage element with a second voltage at the second energy storage element; control the first switching element to operate in the closed state to electrically couple the center point node to the first network after the pre-charging circuitry is controlled to equalize the first voltage and the second voltage; and control the second element to operate in the closed state to electrically couple the center point node to the second network after the pre-charging circuitry is controlled to equalize the first voltage and the second voltage.

Example 18: The device of any of example 17, wherein, to control the first switching element and to control the second switching element, the processing circuitry configured to generate a control signal at an output node, wherein the output node is coupled to a gate of the first switching element and a gate of the second switching element.

Example 19: A method for connecting a first network comprising a first energy storage element and a second network comprising a second energy storage element, the method comprising: controlling, by processing circuitry, pre-charging circuitry to equalize a first voltage at the first energy storage element with a second voltage at the second energy storage element, wherein the pre-charging circuitry is configured to, when controlling the pre-charging circuitry to equalize the first voltage and the second voltage, limit current to a center point node; wherein a first switching element is configured to bi-directionally allow current between the first network and the center point node when operating in a closed state and to block current in one direction between the first network and the center point node when operating in an open state; wherein the second switching element is configured to bi-directionally allow current between the second network and the center point node when operating in a closed state and to block current in one direction between the second network and the center point node when operating in an open state; controlling, by the processing circuitry, the first switching element to operate in the closed state to electrically couple the center point node to the first network after controlling the pre-charging circuitry to equalize the first voltage and the second voltage; and controlling, by the processing circuitry, the second element to operate in the closed state to electrically couple the center point node to the second network after controlling the pre-charging circuitry to equalize the first voltage and the second voltage.

Example 20: A system comprising: a first network comprising a first energy storage element; a second network comprising a second energy storage element; switching circuitry for electrically coupling the first network and the second network, the switching circuitry comprising: a first switching element configured to bi-directionally allow current between the first network and a center point node when operating in a closed state and to block current in one direction between the first network and the center point node when operating in an open state; and a second switching element configured to bi-directionally allow current between the second network and the center point node when operating in a closed state and to block current in one direction between the second network and the center point node when operating in an open state; and pre-charging circuitry configured to limit current to the center point node when a first voltage at the first energy storage element equalizes with a second voltage at the second energy storage element.

Various aspects have been described in this disclosure. These and other aspects are within the scope of the following claims.

The invention claimed is:

1. A device for connecting a first network comprising a first energy storage element and a second network comprising a second energy storage element, the device comprising:
- switching circuitry configured to electrically couple the first network and the second network, the switching circuitry comprising:
  - a first switching element configured to bi-directionally allow current between the first network and a center point node when operating in a closed state and to block current in one direction between the first network and the center point node when operating in an open state; and
  - a second switching element configured to bi-directionally allow current between the second network and the center point node when operating in a closed state and to block current in one direction between the second network and the center point node when operating in an open state; and
- pre-charging circuitry configured to limit current to the center point node when a first voltage at the first energy storage element equalizes with a second voltage at the second energy storage element.

2. The device of claim 1,
- wherein the first energy storage element comprises one or more of a first capacitor or a first battery; and
- wherein the second energy storage element comprises one or more of a second capacitor or a second battery.

3. The device of claim 1, wherein the pre-charging circuitry comprises:
- uni-directional current controlling circuitry configured to control current between a first node of the uni-directional current controlling circuitry and a second node of the uni-directional current controlling circuitry, wherein the second node of the uni-directional current controlling circuitry is coupled to the center point node;
- a first diode configured to electrically couple the first network and the first node of the uni-directional current controlling circuitry; and
- a second diode configured to electrically couple the second network and the first node of the uni-directional current controlling circuitry.

4. The device of claim 3, wherein the uni-directional current controlling circuitry comprises a switched-mode power supply (SMPS) configured to limit the current to the center point node.

5. The device of claim 3, wherein the uni-directional current controlling circuitry comprises:
- a third switching element comprising a drain coupled to the first diode and the second diode and comprising a source;
- an inductive element comprising a first node coupled to the source of the third switching element and a second node coupled to the center point node; and
- a fourth diode comprising an anode coupled to a reference node and a cathode coupled to the first node of the inductive element.

6. The device of claim 3, wherein the uni-directional current controlling circuitry comprises:
- an inductive element comprising a first node coupled to the first diode and the second diode and a second node;
- a third switching element comprising a source coupled to the second node of the inductive element and a drain coupled to the center point node; and
- a fourth diode comprising an anode coupled to a reference node and a cathode coupled to the second node of the inductive element.

7. The device of claim 3, wherein the uni-directional current controlling circuitry comprises a linear current source configured to limit the current to the center point node.

8. The device of claim 3, wherein the uni-directional current controlling circuitry comprises:
- a third switching element comprising a drain coupled to the first diode and the second diode and comprising a source coupled to the center point node.

9. The device of claim 3, wherein the uni-directional current controlling circuitry comprises:
- a third switching element comprising a drain coupled to the center point node and comprising a source coupled to the first diode and the second diode.

10. The device of claim 3,
- wherein the first diode comprises an anode coupled to the first network and a cathode coupled to the first node of the uni-directional current controlling circuitry; and
- wherein the second diode comprises an anode coupled to the second network and a cathode coupled to the first node of the uni-directional current controlling circuitry.

11. The device of claim 3,
- wherein the first diode comprises an anode coupled to the first node of the uni-directional current controlling circuitry and a cathode coupled to the first network; and
- wherein the second diode comprises an anode coupled to the first node of the uni-directional current controlling circuitry and a cathode coupled to the second network.

12. The device of claim 1, wherein the pre-charging circuitry comprises:
- a first bi-directionally blocking switching element configured to electrically couple the first network and a first node of the uni-directional current controlling circuitry;
- a second bi-directionally blocking switching element configured to electrically couple the second network and the first node of the uni-directional current controlling circuitry; and
- the uni-directional current controlling circuitry further comprising a second node coupled to the center point node.

13. The device of claim 12, wherein the uni-directional current controlling circuitry comprises a switched-mode power supply (SMPS) configured to limit the current to the center point node.

14. The device of claim 12, wherein the uni-directional current controlling circuitry comprises:
- an inductive element comprising a first node coupled to the first node of the uni-directional current controlling circuitry and a second node coupled to the center point node; and
- a diode comprising an anode coupled to a reference node and a cathode coupled to the first node of the inductive element.

15. The device of claim 1,
- wherein the first switching element comprises a first n-channel metal-oxide-semiconductor field-effect transistor (MOSFET) transistor comprising a source coupled to the first network and a drain coupled to the center point node, wherein the first n-channel MOSFET comprises a first intrinsic diode comprising an anode coupled to the first network and a cathode coupled to the center point node; and
- wherein the second switching element comprises a second n-channel MOSFET comprising a drain coupled to the center point node and a source coupled to the second network, wherein the second n-channel MOSFET comprises a second intrinsic diode comprising an anode coupled to the second network and a cathode coupled to the center point node.

16. The device of claim 1,
wherein the first switching element comprises a first n-channel metal-oxide-semiconductor field-effect transistor (MOSFET) transistor comprising a drain coupled to the first network and a source coupled to the center point node, wherein the first n-channel MOSFET comprises a first intrinsic diode comprising an anode coupled to the center point node and a cathode coupled to the first network; and
wherein the first switching element comprises a second n-channel MOSFET comprising a source coupled to the center point node and a drain coupled to the second network, wherein the second n-channel MOSFET comprises a second intrinsic diode comprising an anode coupled to the center point node and a cathode coupled to the second network.

17. The device of claim 1, comprising processing circuitry configured to:
control the pre-charging circuitry to equalize a first voltage at the first energy storage element with a second voltage at the second energy storage element;
control the first switching element to operate in the closed state to electrically couple the center point node to the first network after the pre-charging circuitry is controlled to equalize the first voltage and the second voltage; and
control the second element to operate in the closed state to electrically couple the center point node to the second network after the pre-charging circuitry is controlled to equalize the first voltage and the second voltage.

18. The device of claim 17, wherein, to control the first switching element and to control the second switching element, the processing circuitry configured to generate a control signal at an output node, wherein the output node is coupled to a gate of the first switching element and a gate of the second switching element.

19. A method for connecting a first network comprising a first energy storage element and a second network comprising a second energy storage element, the method comprising:
controlling, by processing circuitry, pre-charging circuitry to equalize a first voltage at the first energy storage element with a second voltage at the second energy storage element, wherein the pre-charging circuitry is configured to, when controlling the pre-charging circuitry to equalize the first voltage and the second voltage, limit current to a center point node;
wherein a first switching element is configured to bi-directionally allow current between the first network and the center point node when operating in a closed state and to block current in one direction between the first network and the center point node when operating in an open state;
wherein a second switching element is configured to bi-directionally allow current between the second network and the center point node when operating in a closed state and to block current in one direction between the second network and the center point node when operating in an open state;
controlling, by the processing circuitry, the first switching element to operate in the closed state to electrically couple the center point node to the first network after controlling the pre-charging circuitry to equalize the first voltage and the second voltage; and
controlling, by the processing circuitry, the second element to operate in the closed state to electrically couple the center point node to the second network after controlling the pre-charging circuitry to equalize the first voltage and the second voltage.

20. A system comprising:
a first network comprising a first energy storage element;
a second network comprising a second energy storage element;
switching circuitry for electrically coupling the first network and the second network, the switching circuitry comprising:
a first switching element configured to bi-directionally allow current between the first network and a center point node when operating in a closed state and to block current in one direction between the first network and the center point node when operating in an open state; and
a second switching element configured to bi-directionally allow current between the second network and the center point node when operating in a closed state and to block current in one direction between the second network and the center point node when operating in an open state; and
pre-charging circuitry configured to limit current to the center point node when a first voltage at the first energy storage element equalizes with a second voltage at the second energy storage element.

* * * * *